US010115223B2

(12) United States Patent
Tanner et al.

(10) Patent No.: US 10,115,223 B2
(45) Date of Patent: Oct. 30, 2018

(54) GRAPHICS APPARATUS INCLUDING A PARALLELIZED MACRO-PIPELINE

(71) Applicant: Intel Corporation, Santa Clara, CA (US)

(72) Inventors: Jason Tanner, Folsom, CA (US); Paul S. Diefenbaugh, Portland, OR (US); Atsuo Kuwahara, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/476,984

(22) Filed: Apr. 1, 2017

(65) Prior Publication Data
US 2018/0286101 A1 Oct. 4, 2018

(51) Int. Cl.
*G06T 15/00* (2011.01)
*H04N 19/42* (2014.01)
*H04N 19/17* (2014.01)
*G06T 1/60* (2006.01)
*G06T 1/20* (2006.01)
*G06F 1/32* (2006.01)
*G09G 5/36* (2006.01)

(52) U.S. Cl.
CPC .......... *G06T 15/005* (2013.01); *G06F 1/3265* (2013.01); *G06T 1/20* (2013.01); *G06T 1/60* (2013.01); *G09G 5/363* (2013.01); *H04N 19/17* (2014.11); *H04N 19/42* (2014.11); *G06T 2210/52* (2013.01)

(58) Field of Classification Search
None
See application file for complete search history.

(56) References Cited

U.S. PATENT DOCUMENTS

| | | | | |
|---|---|---|---|---|
| 6,065,027 | A * | 5/2000 | Cashman | H04L 29/06 379/93.08 |
| 7,075,541 | B2 * | 7/2006 | Diard | G06T 15/005 345/502 |
| 2001/0043615 | A1 * | 11/2001 | Park | H04N 7/17318 370/474 |
| 2004/0177155 | A1 * | 9/2004 | Enokida | G06T 9/007 709/236 |
| 2006/0132491 | A1 * | 6/2006 | Riach | G06T 15/005 345/505 |
| 2007/0101013 | A1 * | 5/2007 | Howson | G06F 9/3824 709/231 |

(Continued)

OTHER PUBLICATIONS

U.S. Appl. No. 62/374,696, entitled "Optimized Display Image Rendering," filed Aug. 12, 2016, 33 pages.
(Continued)

*Primary Examiner* — Joni Richer
(74) *Attorney, Agent, or Firm* — Jordan IP Law, LLC

(57) ABSTRACT

An embodiment of a graphics apparatus may include a frame divider to divide a frame into two or more sub-frames, and a parallelized post-render stage communicatively coupled to the frame divider to process a sub-frame of the two or more sub-frames in parallel with a render operation. The parallelized post-render stage may include a post-processor communicatively coupled to the frame divider to post-process a rendered sub-frame in parallel with the render operation. Other embodiments are disclosed and claimed.

6 Claims, 21 Drawing Sheets

(56) References Cited

U.S. PATENT DOCUMENTS

| | | | |
|---|---|---|---|
| 2009/0160969 A1* | 6/2009 | Kuroiwa | H04N 5/23293 348/223.1 |
| 2015/0116311 A1* | 4/2015 | Leung | G06T 15/005 345/419 |
| 2015/0237356 A1* | 8/2015 | Wu | H04N 19/70 375/240.03 |
| 2017/0013274 A1* | 1/2017 | Sadhwani | H04N 19/107 |
| 2017/0185900 A1 | 6/2017 | Paul et al. | |

OTHER PUBLICATIONS

U.S. Appl. No. 15/200,402, entitled "Dynamic Fidelity Updates for Encoded Displays," filed Jul. 1, 2016, 67 pages.

U.S. Appl. No. 14/978,017, entitled "Tiled Wireless Display," filed Dec. 22, 2015, 18 pages.

* cited by examiner

Graphics Processor Command Format
900

GRAPHICS APPARATUS INCLUDING A PARALLELIZED MACRO-PIPELINE

TECHNICAL FIELD

Embodiments generally relate to graphics processing systems. More particularly, embodiments relate to a graphics apparatus including a parallelized macro-pipeline.

BACKGROUND

A graphics system may include a render engine and post-render processing. The render engine may process geometries into primitives such as triangles. The primitives may include vertices. Various render operations may be applied to the primitives and/or the primitive vertices. Some render engines may be tile-based. Post-render processing may generally be pixel-based and applied to an entire frame of pixels.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
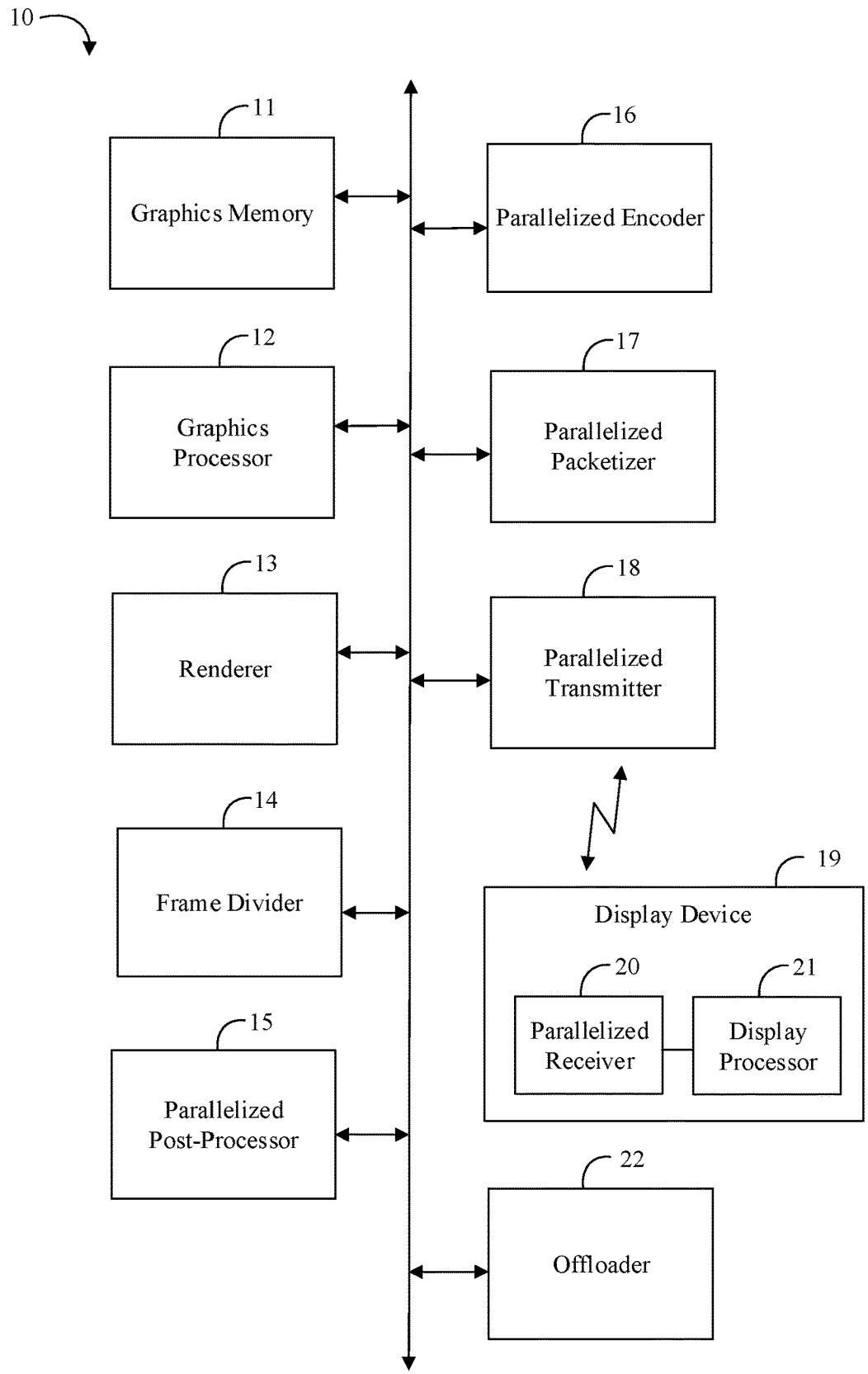
FIG. 1 is a block diagram of an example of an electronic processing system according to an embodiment.

Turning now to FIG. 1, an embodiment of an electronic processing system 10 may include graphics memory 11, and a graphics processor 12 communicatively coupled to the graphics memory 11. The graphics processor 12 may include a renderer 13 to render a frame, a frame divider 14 communicatively coupled to the renderer 13 to divide the frame into two or more sub-frames, a parallelized post-processor 15 communicatively coupled to the frame divider 14 to post-process a rendered sub-frame in parallel with the renderer 13, a parallelized encoder 16 communicatively coupled to the parallelized post-processor 15 to encode a post-processed sub-frame in parallel with the post-processor 14, a parallelized packetizer 17 communicatively coupled to the parallelized encoder 16 to create a packetized sub-frame for an encoded sub-frame in parallel with the parallelized encoder 16, and a parallelized transmitter 18 communicatively coupled to the parallelized packetizer 17 to transmit a packetized sub-frame in parallel with the parallelized packetizer 17. Some embodiments of the system 10 may further include a display device 19 communicatively coupled to the parallelized transmitter 18, the display device 19 including a parallelized receiver 20 to receive the packetized sub-frame. In some embodiments, the display device 19 may also include a display processor 21 communicatively coupled to the parallelized receiver 20 to perform one or more post-process operations. For example, the graphics processor 12 may include an offloader 22 communicatively coupled to the frame divider 14 to offload one or more post-process operations to the display processor 21.

Embodiments of each of the above graphics memory 11, graphics processor 12, renderer 13, frame divider 14, post-processor 15, parallelized encoder 16, parallelized packetizer 17, parallelized transmitter 18, display device 19, parallelized receiver 20, display processor 21, offloader 22, and other system components may be implemented in hardware, software, or any suitable combination thereof. For example, hardware implementations may include configurable logic such as, for example, programmable logic arrays (PLAs), field-programmable gate arrays (FPGAs), complex programmable logic devices (CPLDs), or in fixed-functionality logic hardware using circuit technology such as, for example, ASIC, complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 2:
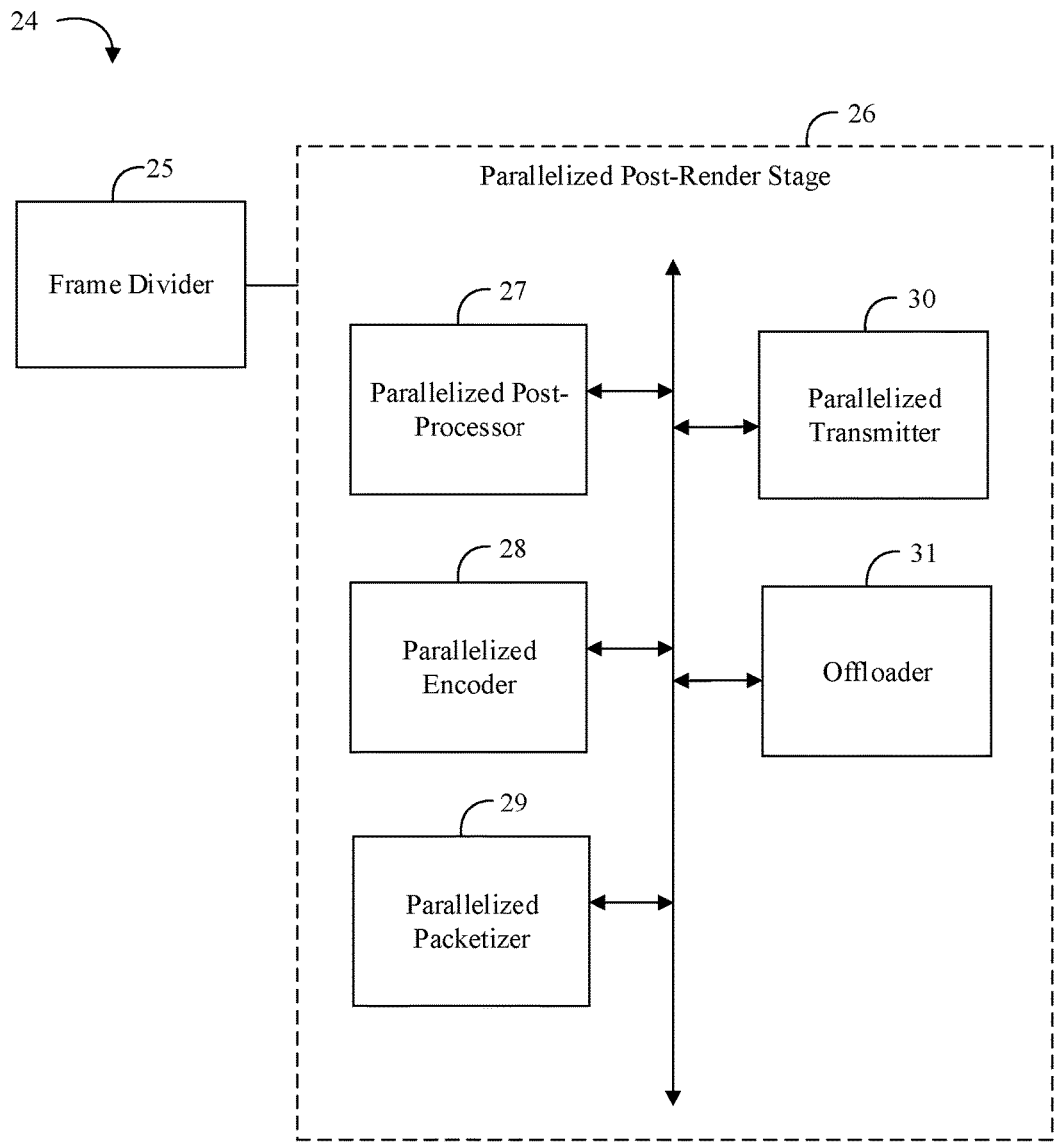
FIG. 2 is a block diagram of an example of a graphics apparatus according to an embodiment.

Turning now to FIG. 2, a graphics apparatus 24 may include a frame divider 25 to divide a frame into two or more sub-frames, and a parallelized post-render stage 26 communicatively coupled to the frame divider 25 to process a sub-frame of the two or more sub-frames in parallel with a render operation. For example, the parallelized post-render stage may include one or more of a parallelized post-processor 27 communicatively coupled to the frame divider 25 to post-process a rendered sub-frame in parallel with the render operation, a parallelized encoder 28 communicatively coupled to the parallelized post-processor 27 to encode a post-processed sub-frame in parallel with the parallelized post-processor 27, a parallelized packetizer 29 communicatively coupled to the parallelized encoder 28 to packetize an encoded sub-frame in parallel with the parallelized encoder 28, and/or a parallelized transmitter 30 communicatively coupled to the parallelized packetizer 29 to transmit a packetized sub-frame in parallel with the parallelized packetizer 29. For example, the frame divider 25 may be configured to dynamically re-divide the frame into a different set of two or more sub-frames. In some embodiments, the post-render stage 26 may further include an offloader 31 communicatively coupled to the frame divider 25 to offload one or more post-process operations.

Embodiments of each of the above frame divider 25, post-render stage 26, parallelized post-processor 27, parallelized encoder 28, parallelized packetizer 29, parallelized transmitter 30, offloader 31, and other components of the apparatus 24 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
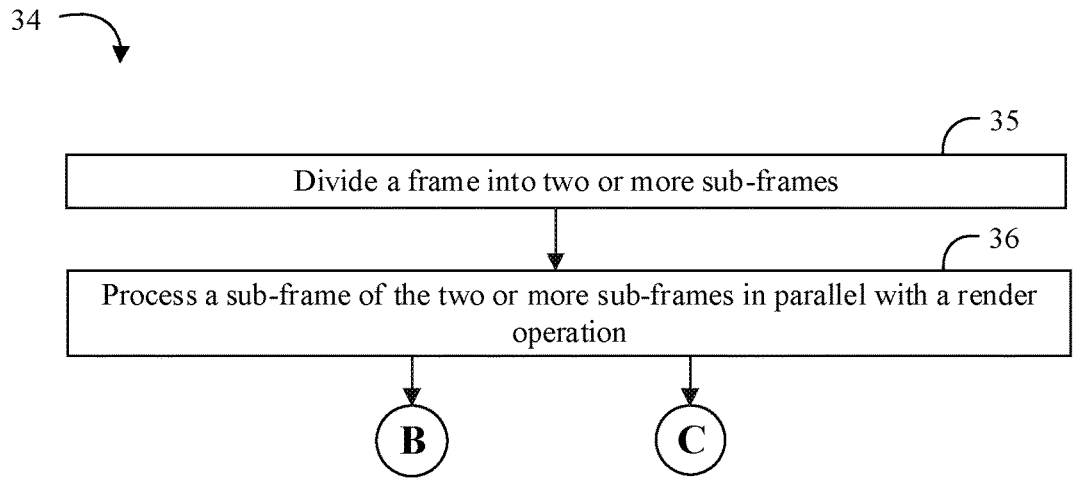
FIGS. 3A to 3C are flowcharts of an example of a method of processing graphics according to an embodiment.
Figure 3B:
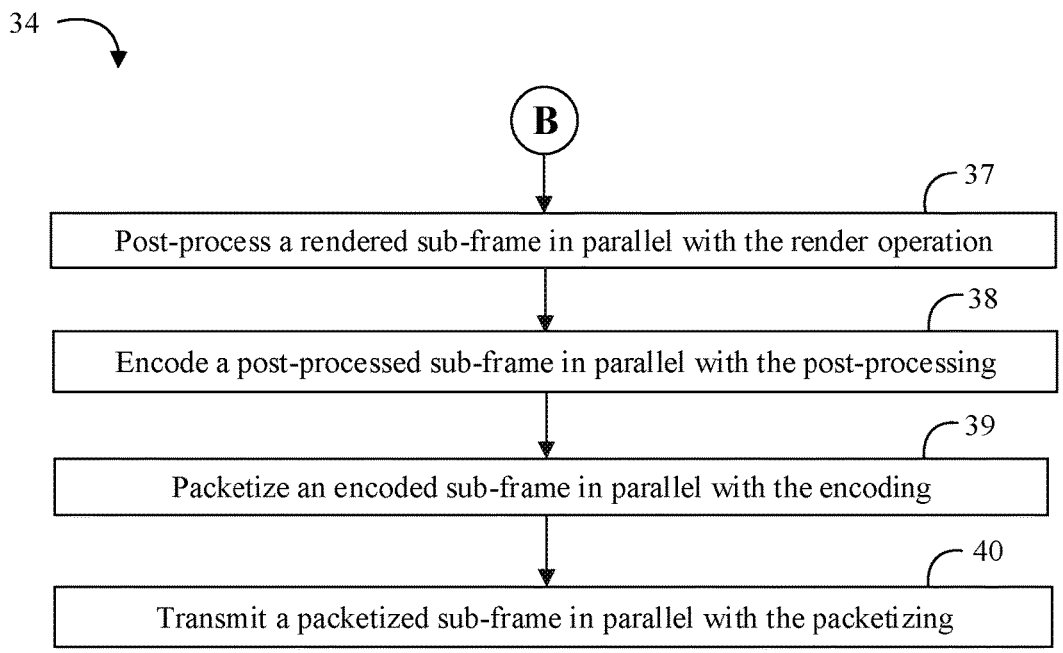
Figure 3C:
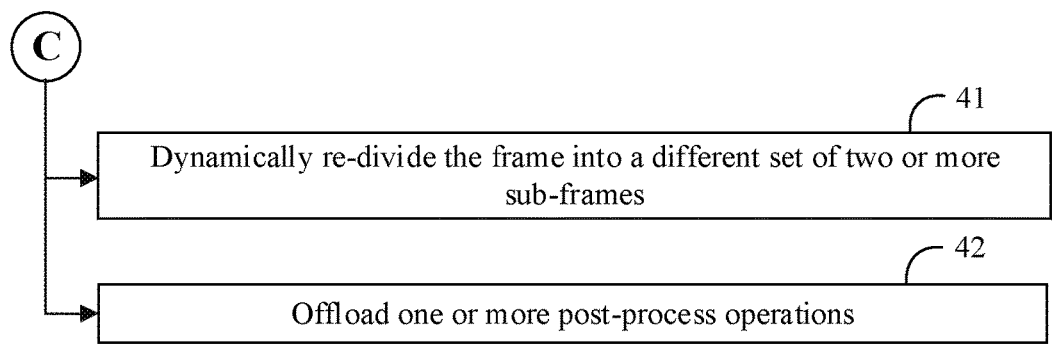

Turning now to FIGS. 3A to 3C, a method 34 of processing graphics may include dividing a frame into two or more sub-frames at block 35, and processing a sub-frame of the two or more sub-frames in parallel with a render operation at block 36. The method 34 may further include one or more of post-processing a rendered sub-frame in parallel with the render operation at block 37, encoding a post-processed sub-frame in parallel with the post-processing at block 38, packetizing an encoded sub-frame in parallel with the encoding at block 39, and transmitting a packetized sub-frame in parallel with the packetizing at block 40. The method 34 may further include dynamically re-dividing the frame into a different set of two or more sub-frames at block 41 and/or offloading one or more post-process operations at block 42.

Embodiments of the method 34 may be implemented in a system, apparatus, GPU, PPU, or a graphics processor pipeline apparatus such as, for example, those described herein. More particularly, hardware implementations of the method 34 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 34 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 34 may be implemented on a computer readable medium as described in connection with Examples 18 to 24 below.

For example, embodiments or portions of the method 34 may be implemented in applications (e.g. through an API) or driver software. Other embodiments or portions of the method 34 may be implemented in specialized code (e.g. shaders) to be executed on a GPU. Other embodiments or portions of the method 34 may be implemented in fixed function logic or specialized hardware (e.g. in the GPU).

Some embodiments may advantageously provide a parallelized macro-pipeline for low-latency three-dimensional (3D), augmented reality (AR), virtual reality (VR), and/or merged reality (MR) applications. Some embodiments may parallelize an end-to-end pipeline spanning the content source and the content consumer (e.g. a host device and a target display device). Advantageously, some embodiments may reduce motion-to-photon latency.

Motion-to-photon latency may refer to an amount of time it takes for a user's movement to be captured, processed, and rendered as visual, audio, or other stimuli in the target display device (e.g. a head-mounted display (HMD)). For example, acceptable motion-to-photon latency may be an important performance parameter for 3D/AR/VR/MR applications. In some cases, failure to consistently achieve low latency may result in a loss of immersion, disorientation, or user discomfort (e.g. nausea). Some embodiments may advantageously utilize segmented and/or parallelized processing across all or part of the end-to-end pipeline to reduce motion-to-photon latency.

Some embodiments may provide a framework for efficiently parallelizing graphics workloads across macro-pipeline stages and apply such parallelization to 3D/AR/VR/MR workloads. In some embodiments, a portion of the macro-pipeline may be offloaded to the HMD. In some embodiments, a render target or frame may be segmented into sub-frames. For example, a size of the sub-frames may be a multiple of a tile-size for an associated tile-based rendering. Other segmentation schemes may also be employed. Sub-frames may readily facilitate High Efficiency Video Coding (HEVC) tiles or multi-view HEVC encoded streams (which may be tile-based).

Tile-based rendering may generally be applied to improve hardware localization (e.g. cache utilization) but in other systems may not employed to reduce the latency of subsequent phases. Although referred to as "tile-based," in other systems the tiling operations may not extend beyond the render stage. In accordance with some embodiments, post-render sub-frame processing may advantageously extend the tile-based operations.

Figure 4:
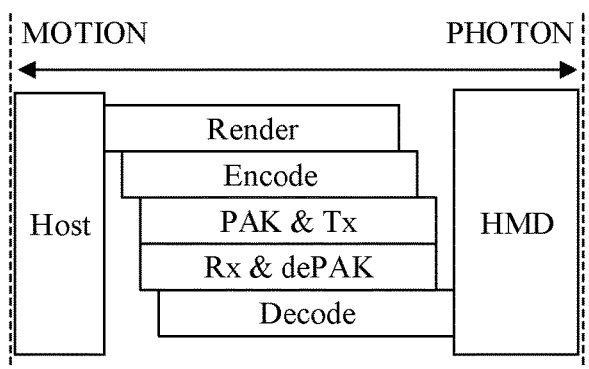
FIG. 4 is an illustrative timing diagram of a parallelized post-render graphics pipeline according to an embodiment.

Turning now to FIG. 4, a host side may receive HMD position and movement information, for example from an inertial measurement unit (IMU) in the HMD, and use that information to begin tile-based rendering for a frame. A geometry may be globally processed in the render stage and assigned a tile. The tiles and/or sub-frames may be uniformly sized or may be variably sized. When a segment of N-tiles is rendered completely and committed to memory (e.g. a completed sub-frame), subsequent pipeline stages may proceed before the entire frame has been rendered. The tiles and/or sub-frames may be uniformly sized or may be variably sized. Advantageously, the subsequent stages (e.g. post-render) may begin earlier on the completed sub-frame instead of waiting for the entire frame to be rendered and committed to memory. For example, post-render stages for wireless VR may include a post-process stage, an encode stage, a packetization stage, a transmit/receive stage, a decode stage, etc. All of these stages may occur post-render, but in accordance with some embodiments may advantageously be executed in parallel with the render stage as part of a parallelized sub-frame-based pipeline.

In other systems, each or some of these stages may be serialized (e.g. they start only after the prior stage fully completes), which may make their latencies additive. Some embodiments may change in the way frames are rendered by graphics engines to identify when rendered data may be available to subsequent (post-render) stages before the entire frame has been rendered. For tile-based render architectures, a sub-frame may include one or more render tiles and after all of the one or more render tiles of the sub-frame has been completely rendered the sub-frame may be considered to be ready for the subsequent stages. In some embodiments, the encode stage may begin after the top few tile-rows (e.g. a first sub-frame) have been rendered which may greatly reduce the end-to-end latency.

As shown in FIG. 4, similar parallelization may be applied to various post-render stages (e.g. including packetization, transmit, etc.). For example, the render phase may be performed at least in part on a GPU including one or more executions units (EUs). The encode phase may be performed at least in part on a fixed function video encoder. The packetization (PAK) may be performed at least in part by a CPU, which may include a flexible packetizer. The transmitter (Tx) may be part of a network interface component (NIC), which may be wired or wireless (WNIC) and which may also include a receiver (Rx).

In accordance with some embodiments, the target device (e.g. HMD) may also include a parallelized sub-frame-based pipeline. Some embodiments may parallelize decode. Some embodiments may also offload some back-end render and post-render tasks to the HMD. Examples of tasks that may be offloaded may include re-projection (e.g. also referred to as asynchronous space warp and/or asynchronous time warp), barrel distortion, chromatic aberration correction, etc. Parallelizing the HMD and/or implementing various offloaded tasks on the HMD may reduce the end-to-end latency of the pipeline to support low latency motion-to-photon performance. In some embodiments, the display phase may also be parallelized (e.g. at the HMD) to scan out segments just-in-time (e.g. also referred to as beam-chasing).

Figure 5A:
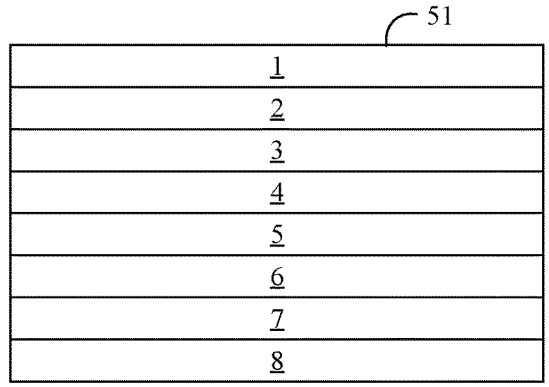
FIGS. 5A to 5C are block diagrams of examples of a frame divided into sub-frames according to an embodiment.
Figure 5B:
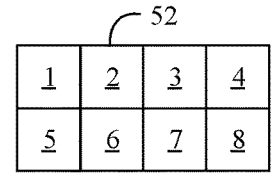
Figure 5C:
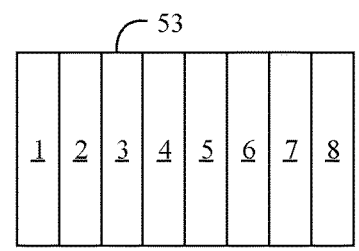

Turning now to FIGS. 5A to 5C, examples of frames 51, 52, and 53 may be divided into eight sub-frames, numbered one (1) through (8). The number of sub-frames, the size of the sub-frames, the position of the sub-frames, the order the sub-frames, and other characteristics of the sub-frames may all be different for different embodiments or different applications. The characteristics of the sub-frames may also be dynamically changed. For example, if a different HMD is connected to the host, the host may change the characteristics of the sub-frames to match the newly attached HMD.

Figure 6:
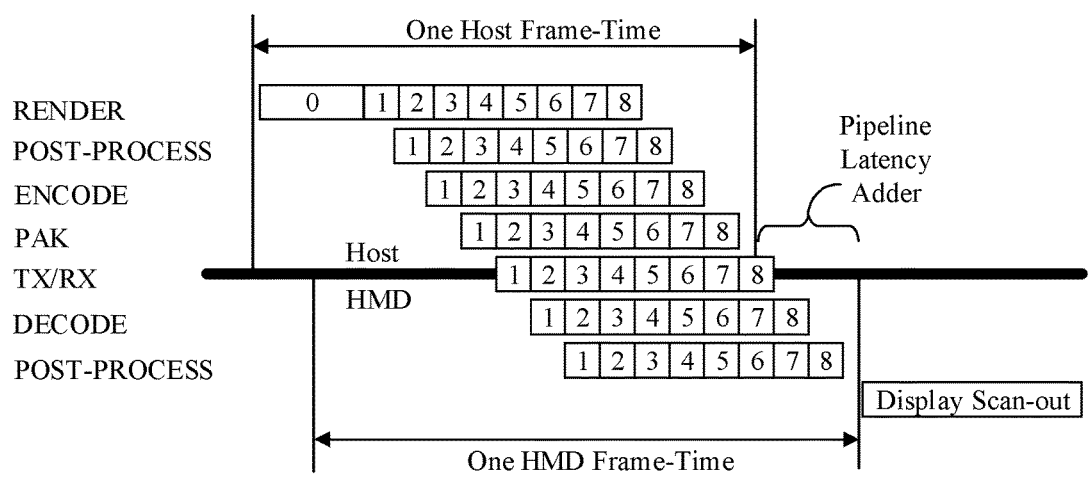
FIG. 6 is another illustrative timing diagram of a parallelized post-render graphics pipeline according to an embodiment.

Turning now to FIG. 6, a graphics system may include a render stage and a plurality of post-render stages. For example, the post-render stages may include a post-process stage, an encode stage, a packetization stage, and a transmission stage on the host side. The post-render stages may also include a reception stage, a de-packetization stage (not shown), a decode stage, and another post-process stage on the HMD side. In accordance with some embodiments, render time may be reduced by offloading some or all of the post-process tasks to the HMD.

FIG. 6 shows how processing may proceed for various sub-frames 1 through 8 through the various stages (e.g. corresponding to any of the sub-frames 1 through 8 in FIGS. 5A to 5C). Some initial load/setup may occur in phase zero (0) of the render stage. As shown in FIG. 6, subsequent processing at each stage for each sub-frame may begin as soon as the prior stage is completed. Some embodiments may advantageously provide a host side and/or a HMD side parallelized post-render graphics pipeline which may reduce motion-to-photon latency. Communication transports between the two parallelized post-render graphics pipelines may be wired or wireless and applications other than 3D/VR/AR/MR may benefit from the various embodiments (e.g. wireless docking, smart home, data processing, etc.). For wireless VR, the ability of some embodiments to begin post-render stages before the frame has been fully rendered, and extend the tile-based parallelized pipeline end-to-end, may be important or critical to meeting a latency requirement for 3D/VR/AR/MR applications (e.g. <20 ms motion-to-photon latency). Reducing latency and/or bandwidth may also be important for some wired transports (e.g. USB display).

Figure 7:
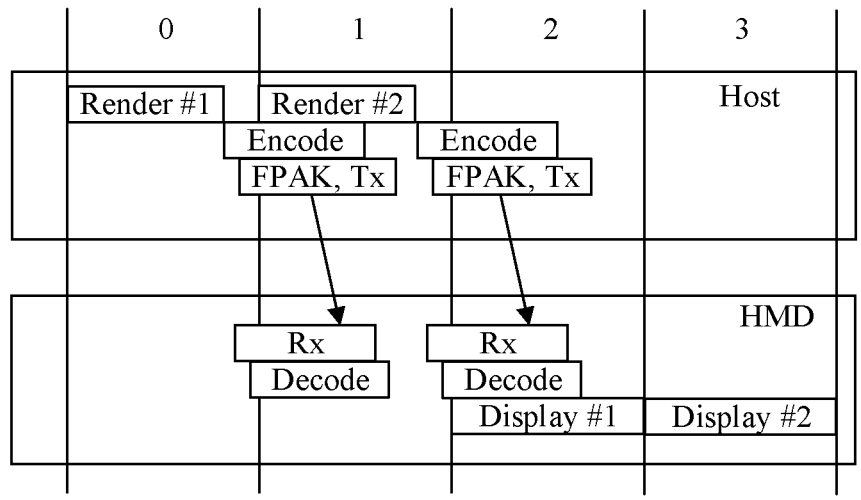
FIG. 7 is another illustrative timing diagram of a parallelized post-render graphics pipeline according to an embodiment.
Figure 8:
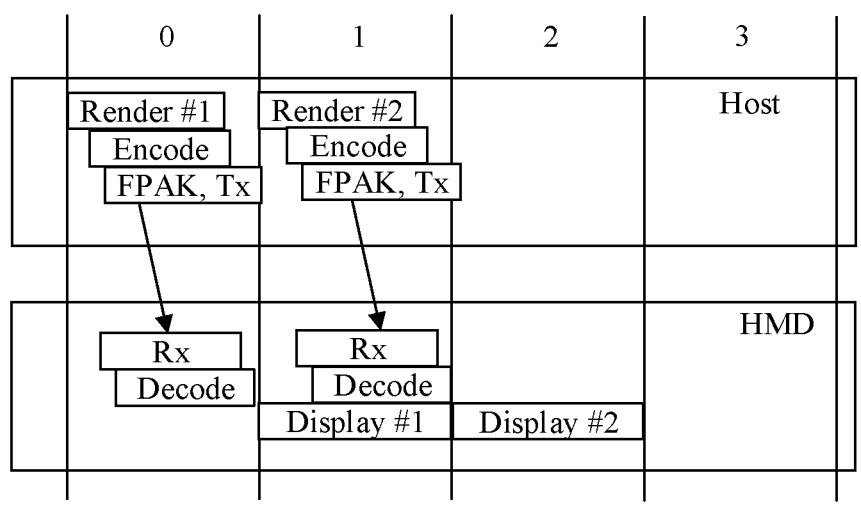
FIG. 8 is another illustrative timing diagram of a parallelized post-render graphics pipeline according to an embodiment.

FIG. 7 shows an example timing diagram for an embodiment where just the back-end pipeline is parallelized. For the embodiment of FIG. 7, latency may be reduced by offloading some post-processing tasks to the HMD. FIG. 8 shows an example timing diagram for an embodiment where both the front-end pipeline and the back-end pipeline are parallelized. For the embodiment of FIG. 8, latency may be further reduced by sub-frame-based encoding in parallel with tile-based rendering.

Figure 9:
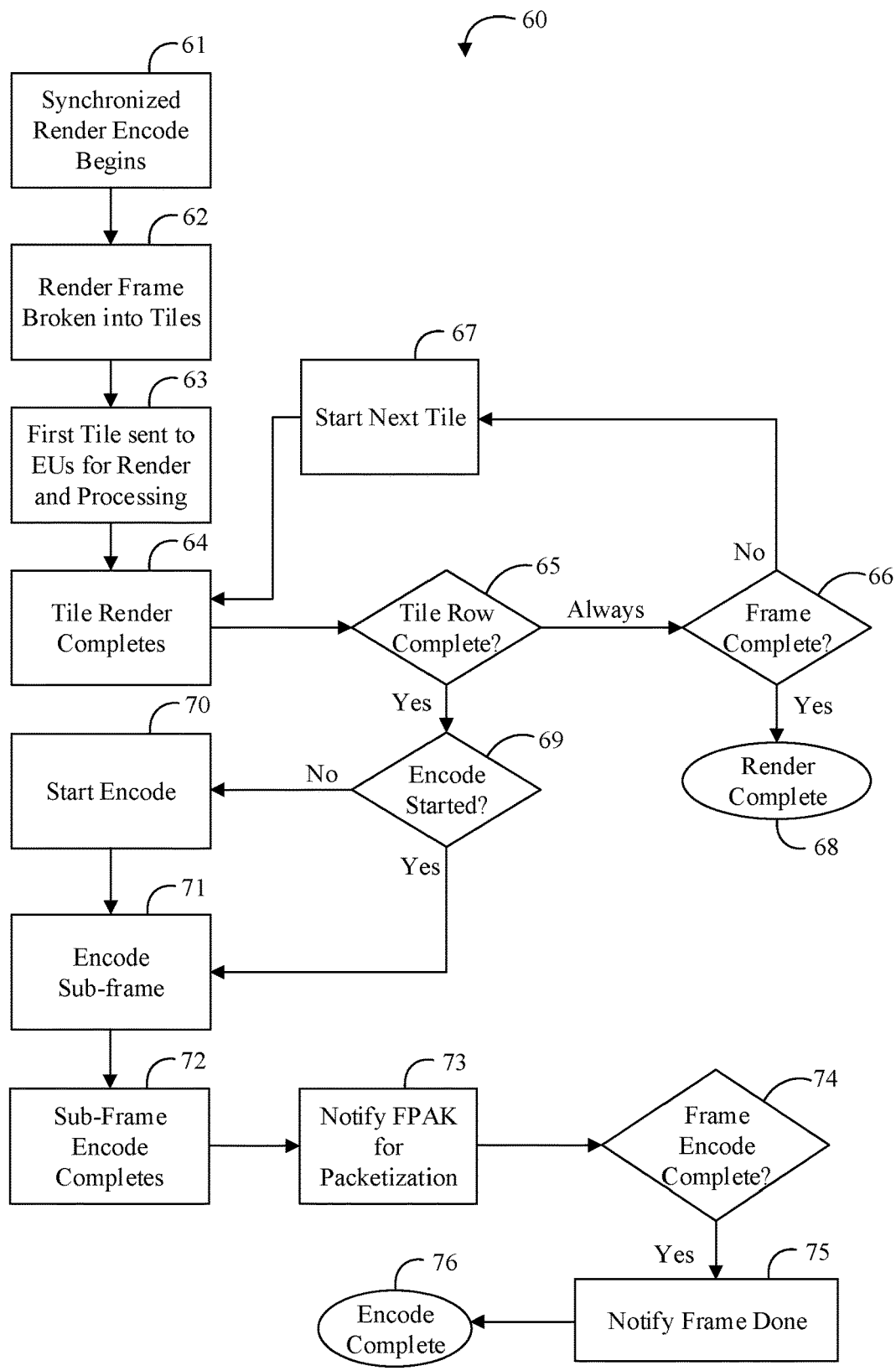
FIG. 9 is a flowchart of another example of a method of processing graphics according to an embodiment.

Turning now to FIG. 9, a method 60 of processing graphics may include parallel execution paths for render and encode operations. Synchronized render and encode may begin at block 61. The render frame may be broken into render-tiles at block 62. A first tile may be sent for render and processing at block 63. When the tile render completes at block 64, a determination may be made at block 65 if a tile row is complete (e.g. where the tile row may correspond to a sub-frame). Whether or not the tile row is complete (e.g. always), another determination may be made at block 66 if the frame is complete. If the frame is not yet complete at block 66, a next tile may be started for rendering at block 67 and the method 60 may continue until the render for that tile is complete at block 64. When the frame is determined to be complete at block 66, the rendering for that frame may be completed at block 68.

When the tile row is complete at block 65, a determination may be made at block 69 if encoding has started. If encoding has not started at block 69, the method 60 may start the encode at block 70. If the encode is determined to be previously started at block 69, or after the encode is started at block 70, the method may proceed to encode the sub-frame at block 71. When the sub-frame encode completes at block 72, the packetizer may be notified at block 73 (e.g. which may start a parallel process for packetization and subsequent transmission), and a determination may be made if the frame encode is complete at block 74. If the frame encode is determined to be complete at block 74, a notification may be made that the frame is done at block 75 and the encoding for that frame may be complete at block 76. Advantageously, the loop through blocks 64, 65, 66, and 68 and the blocks 69, 70, 71, and 72 may run in parallel.

In some embodiments, a graphics microcontroller may be responsible for submitting work such as 3D shaders to be executed on execution units (EUs). The microcontroller may also call fixed function hardware for tasks such as encoding a frame. Many post-processing operations may be adjusted to work on a sub-frame basis to support additional parallelization of the work between the render engine and the post-render engine. For example, post-processing operations such as applying a vignette filter can be done on a sub-frame basis. Some VR-specific post-processing phases such as ATW and barrel distortion may also be done on a sub-frame basis. For example, the various units/modules may be modified to process a portion of a render target based on a provided start address and end address (e.g. a start position and a tile size (x size, y size)).

In this example, the encode phase may need a full tile-row before beginning to encode (e.g. a sub-frame corresponds to a full tile-row). Other video configuration and/or encode architectures may utilize another sub-frame definition. In some embodiments, the sub-frame size may be dynamically changed (e.g. based on content or a type/capability of an attached HMD). The render phase may start and divide the frame into different tiles for tile-based rendering. The tiles may be divided, for example, based on the scene complexity (e.g. triangle density), or may be uniformly scaled. In this example, the scaling may bias toward not extending the tiles too far vertically to provide a better opportunity for the encode phase and the rest of the macro-pipeline to run in parallel.

The microcontroller may submit a tile to begin rendering on the EU. For example, the rendering may involve one step of compositing multiple layers for blending or it may involve multiple steps of blending layers and applying post processing filters. When a tile completes, the microcontroller may be notified. The microcontroller may immediately start the next tile in row order for rendering and check if the previous tile completion completes a tile row (or sub-frame or other unit of work for the encode to start). If the sub-frame is ready (e.g. the tile row is complete), the microcontroller may submit the batch buffer for encode to begin (the driver may have already prepared the batch buffer).

The encoder may then start encoding the sub-frame. The encoder may be stalled based on a tail pointer being updated by the microcontroller indicating the depth of the latest tile completion. The encoder may also be gated by the sub-frames submitted by the microcontroller for the encode phase to start. As the sub-frames are completely rendered, they may be encoded by the encoder. Upon encode completion for a sub-frame, the packetizer may notified for packetization/mux and then the transmitter may be notified for transmission. The foregoing process may continue until the encode for all sub-frames is complete.

With the synchronization between the render phase and the encode phase, the entire pipeline may concurrently work on different parts of the same frame at a time providing only one sub-frame latency for all operations. Some embodiments may additionally, or alternatively, offload some or all of the post processing steps to an appropriately configured HMD for VR/AR/MR applications (e.g. or another processing device for other applications). Some statistics that may be needed for some post-processing operations (e.g. such as the average luminance) may be can be calculated on the host side, provided to the HMD after they are available, and then applied on the HMD (e.g. for temporal anti-aliasing).

In some graphics applications, there may be a stage where the geometries have all been processed into primitives (e.g. triangles). The primitives may be mapped to a two-dimensional (2D) space and there may be a hierarchy to the primitives. For example, the primitives may get added to a depth (Z) buffer based on the depth/occlusion of the primitives. Some embodiments may advantageously correlate the tile-based geometry/primitive processing with the parallelized post-render processing. For example, some embodiments may modify or optimize the front-end processing to support parallelization at the back-end processing.

In accordance with some embodiments, the primitives may be re-ordered or optimized for tile-based processing based on their locations. For example, if the parallelized post-processing is configured to work from top left to bottom right, the primitives may be re-ordered to support that order for the later parallelized post-processing. If there is a first 3D object at the bottom right of the frame, and a second 3D object at the top left of the frame, some embodiments may prioritize and/or re-order processing of the primitives to render the second 3D object before the first 3D object (e.g. if the tile-based processing works from top left to bottom right).

During the render phase, groups of vertices from the triangles that make up the scene may be processed to apply color, texture, lighting, etc. The render phase may include several intermediate passes which eventually get composited onto a first sub-frame. When the entire first sub-frame is composited, post-processing (e.g. de-noise, lighting, sharpen, etc.) may be applied to the sub-frame. The encode phase may then begin encoding the first sub-frame. After the post-processing or encoding for the first sub-frame begins, the render phase may start compositing a second sub-frame, etc. Advantageously, portions of the same frame may be rendered and encoded in parallel, at the same time.

The parallelized post-render processing may generally be applied at a pixel level, after primitive processing has completed. The sub-frame size may not necessarily match identically with the render tile size. The front-end tile-based processing tile size may be a subset of the back-end sub-frame size (e.g. a tile row may make up one sub-frame). In accordance with some embodiments, an efficient or optimum tile size for primitive processing may be different from an efficient or optimum tile size for compositing, which may be different from an efficient or optimum sub-frame size for post-processing, which may be different from a preferred packet size for packetizing and/or transmitting.

Headset for Parallelized Sub-Frame Processing

Figure 10A:
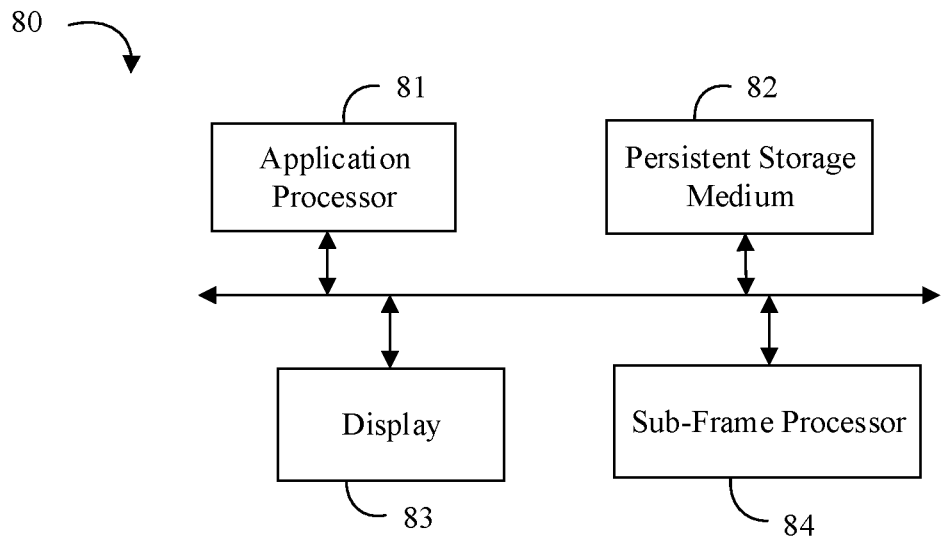
FIG. 10A is a block diagram of another example of an electronic processing system according to an embodiment.

Turning now to FIG. 10A, an embodiment of an electronic processing system 80 may include a processor 81, persistent storage media 82 communicatively coupled to the processor 81, and a display 83 communicatively coupled to the persistent storage media 82 and the application processor 81. The system 80 may also include a sub-frame processor apparatus 84 as described herein (e.g. see FIG. 10B-10C). For example, the system 80 may be implemented as a HMD, further configured to work with sub-frames instead of full frames. In some embodiments, the system 80 may include a gaze tracker to provide gaze/focus information to a host system.

Figure 10B:
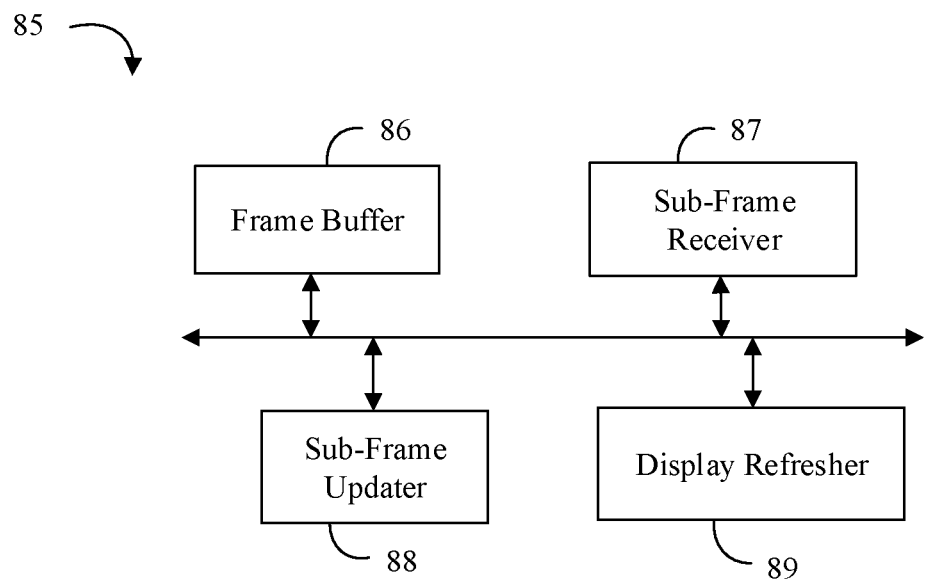
FIG. 10B is a block diagram of another example of a graphics apparatus according to an embodiment.

Turning now to FIG. 10B, an embodiment of a sub-frame processor apparatus 85 may include a frame buffer 86 to store image data for a display, a sub-frame receiver 87 communicatively coupled to the frame buffer 86 to receive a rendered sub-frame (e.g. where the rendered sub-frame corresponds to a portion of a full frame), a sub-frame updater 88 to update the frame buffer 86 with image data from the received rendered sub-frame, and a display refresher 89 communicatively coupled to the frame buffer 86 to refresh the display with the image data from the frame buffer 86. For example, the sub-frame updater 88 may dynamically determine a boundary for the rendered sub-frame. A first resolution for a first received rendered sub-frame may be different from a second resolution for a second received sub-frame. Likewise, a first update rate for a first received sub-frame may be different from a second update rate for a second received sub-frame. In some embodiments, the display refresher 89 may refresh the display with the image data from the frame buffer 86 even if the full frame has not been updated with received rendered sub-frames. In some embodiments, the sub-frame updater 88 may be configured to perform various post-process operations. Advantageously, some embodiments may improve one or more of processing bandwidth, memory bandwidth, network bandwidth, and/or power consumption.

Figure 10C:
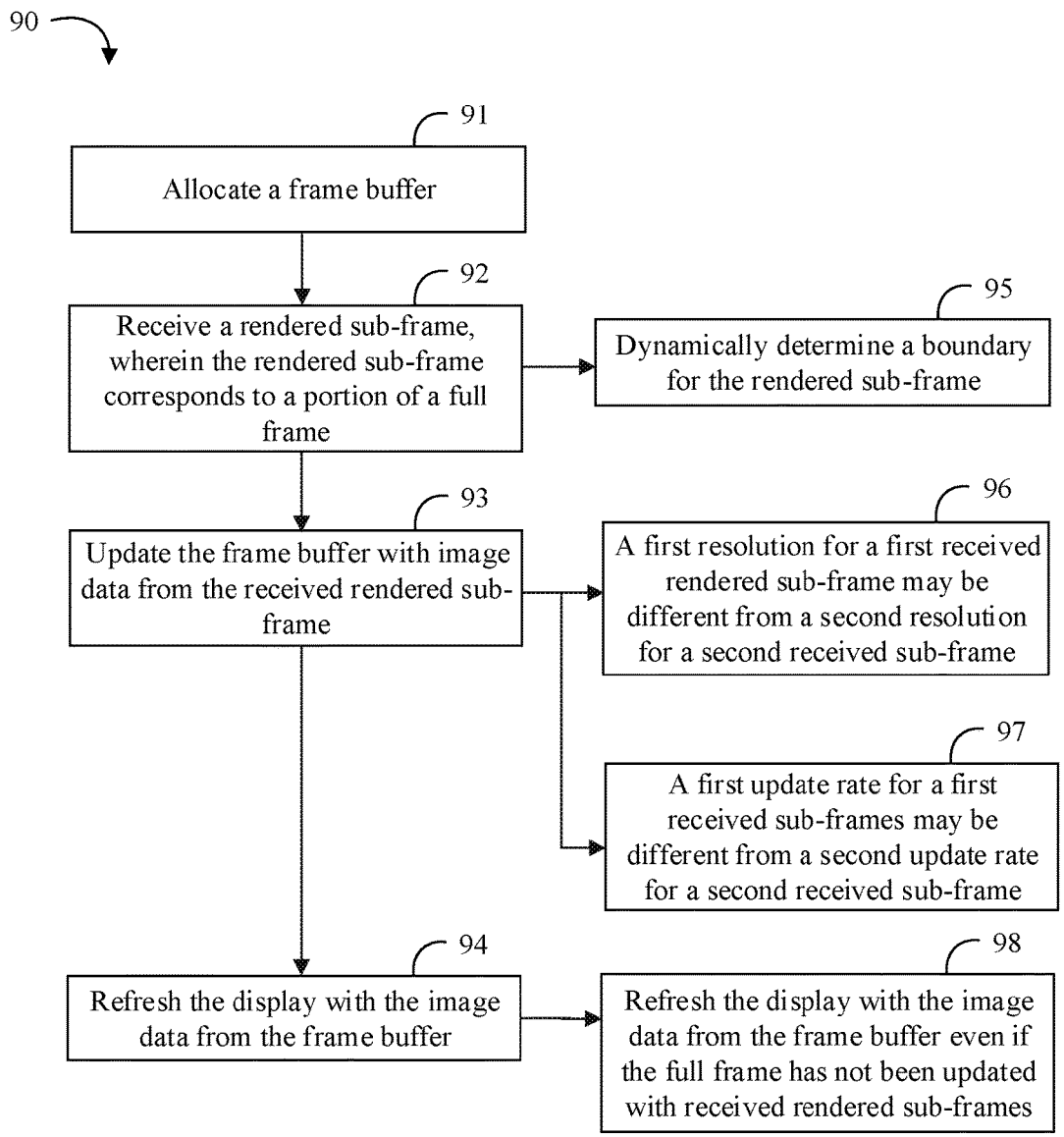
FIG. 10C is a flowchart of another example of a method of processing graphics according to an embodiment.

Turning now to FIG. 10C, an embodiment of a method 90 of updating a frame may include allocating a frame buffer at block 91, receiving a rendered sub-frame, wherein the rendered sub-frame corresponds to a portion of a full frame at block 92, updating the frame buffer with image data from the received rendered sub-frame at block 93, and refreshing the display with the image data from the frame buffer at block 94. The method 90 may also include dynamically determining a boundary for the rendered sub-frame at block 95. For example, a first resolution for a first received rendered sub-frame may be different from a second resolution for a second received sub-frame at block 96. Likewise, a first update rate for a first received sub-frames may be different from a second update rate for a second received sub-frame at block 97. In some embodiments, the method 90 may also include refreshing the display with the image data from the frame buffer even if the full frame has not been updated with received rendered sub-frames at block 98.

Embodiments of the method 90 may be implemented in a system, apparatus, GPU, PPU, or a graphics processor pipeline apparatus such as, for example, those described herein. More particularly, hardware implementations of the method 90 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 90 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 90 may be implemented on a computer readable medium having a set of instructions, which when executed by a computing device cause the computing device to store image data for a display in a frame buffer, receive a rendered sub-frame, wherein the rendered sub-frame corresponds to a portion of a full frame, update the frame buffer with image data from the received rendered sub-frame, and refresh the display with the image data from the frame buffer. The computer readable medium may include a further set of instruction which cause the computing device to dynamically determine a boundary for the rendered sub-frame. In some embodiments, the computer readable medium may include a further set of instruction which cause the computing device to refresh the display with the image data from the frame buffer even if the full frame has not been updated with received rendered sub-frames.

Conventional HMDs may not be configured to handle sub-frames or partial frame buffer updates. Advantageously, an HMD in accordance with some embodiments doesn't expect to always receive a full frame buffer at a time, but may just update the HMD frame buffer based on the sub-frames it receives. For example, the HMD may skip anything it doesn't receive and just refresh the display from data currently in the HMD frame buffer (e.g. e.g. re-use image data from a prior frame). The host side may identify capabilities of the HMD on the receiving side (e.g. display only, parallelized-capable, post-processing capable, etc.).

The sub-frames themselves may be rendered at different frame rates. The region of interest (e.g. where the user is looking) may run at 90 Hz while the other sub-frames may run at 30/45/60 Hz. Some embodiments may not do as much work in the region(s) that the user is not focusing on. Different frame rates may lead to temporal artifacts if there is motion across the boundaries. Some embodiments may apply a temporal filter, such as motion blur to offset the presence of such artifacts.

The sub-frames may be static or in some embodiments there may be dynamic resizing of the sub-frames. In either event, the HMD and the host may coordinate the sub-frame size information. For example, if the content/user/something else on the host requires a change in the sub-frame size(s), the host can communicate that information to the HMD (e.g. and/or vice versa). If the sub-frame sizes change significantly, the HMD may then want to receive a full frame buffer before updating the display. Alternatively, or in addition, sub-frame characteristic information can be transmitted with each chunk (e.g. as metadata). If the sub-frame characteristic changes, the HMD may wait for a full set of sub-frames or may try to extrapolate if the characteristic change is small enough (e.g. small overlap or small gap between the changed sub-frames) to avoid artifacts.

When a region is transmitted, the HMD may receive it and immediately update the local frame buffer with the image data from the region. Advantageously, the HMD does not need to know the frame rate or expect the transmitted regions on a schedule. The HMD expects to receive the frame buffer in chunks and can update the display on a chunk-by-chunk basis. For post-processing on the HMD side, there may be a handshake to specify what post-processing the HMD can handle and what post-processing the host may request. Examples of post-processing that the HMD may be configured to perform may include one or more of vignette, de-noise, lighting, sharpening, re-projection (e.g. also referred to as asynchronous space warp and/or asynchronous time warp), barrel distortion, chromatic aberration correction, etc. Some post-processing may be based on frame-based statistics (e.g. global lighting). Sub-frame data may still be sent in packets, followed by the needed statistics when the statistics are ready. The HMD may assemble the frame buffer, and then apply the frame-based processing based on the later-received statistics.

System Overview

Figure 11:
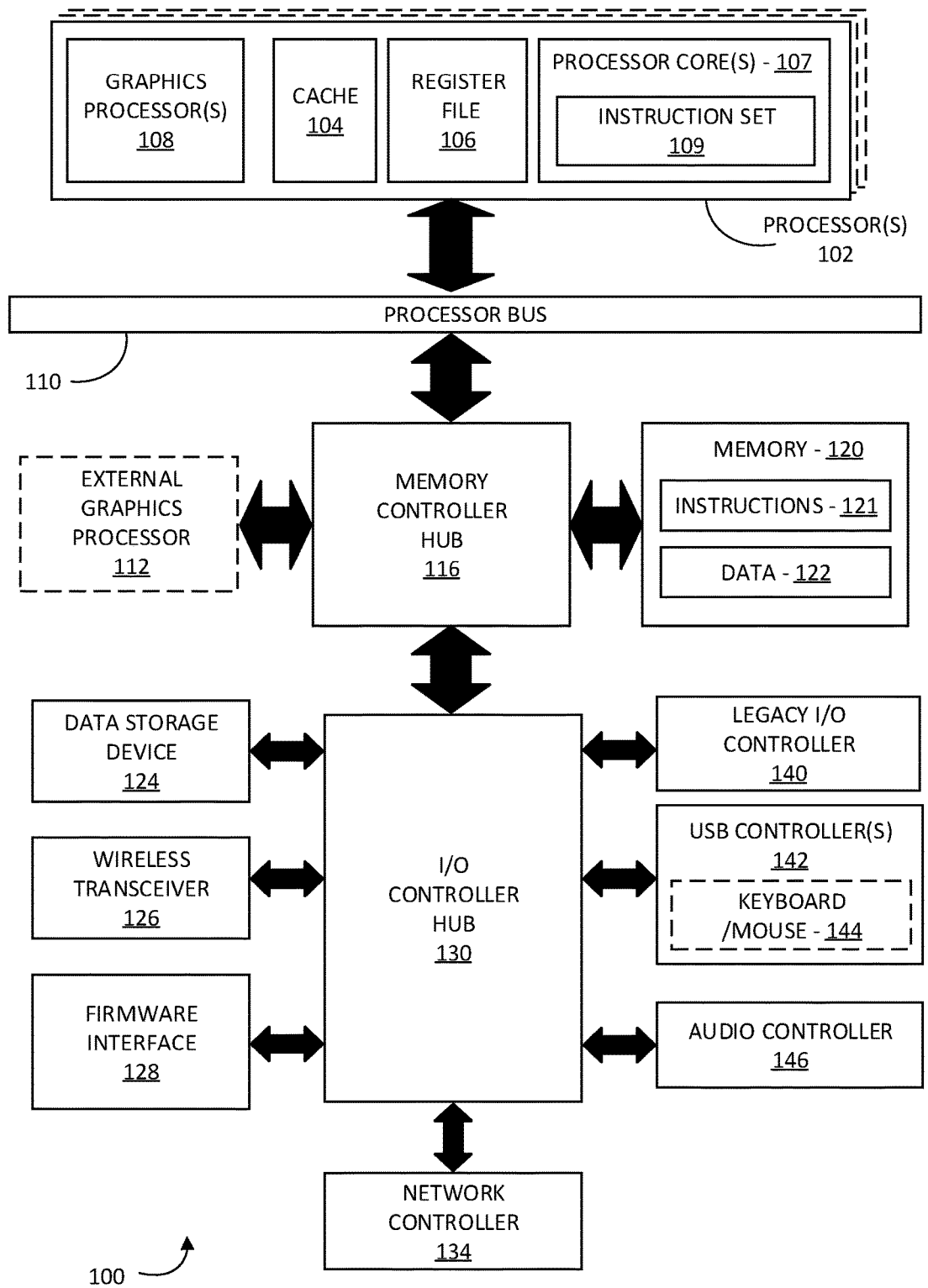
FIGS. 11-13 are block diagrams of an example of an overview of a data processing system according to an embodiment.

FIG. 11 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or LLC) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 12:
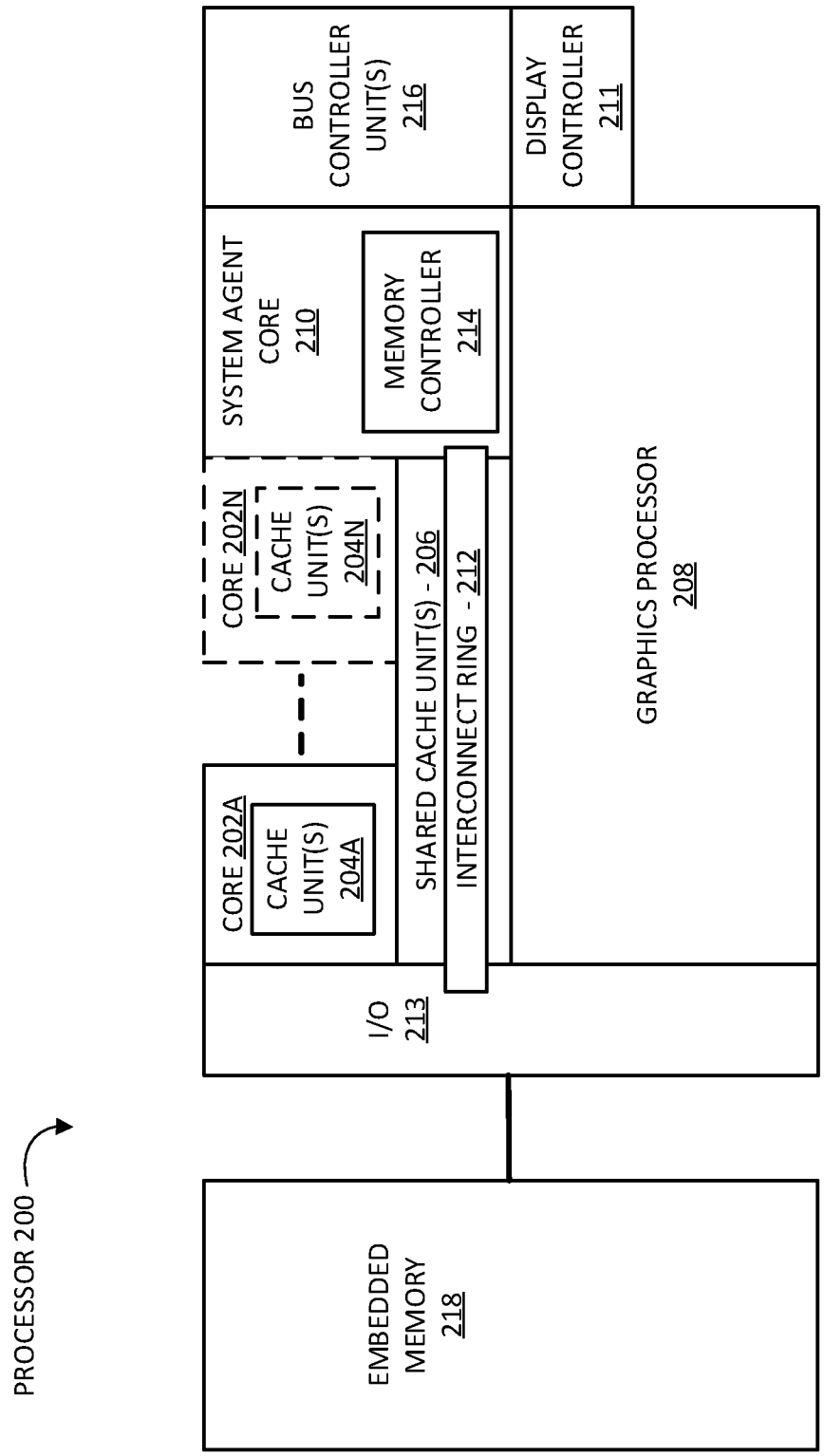

FIG. 12 is a block diagram of an embodiment of a processor 200 having one or more processor cores 202A-202N, an integrated memory controller 214, and an integrated graphics processor 208. Those elements of FIG. 12 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 13:
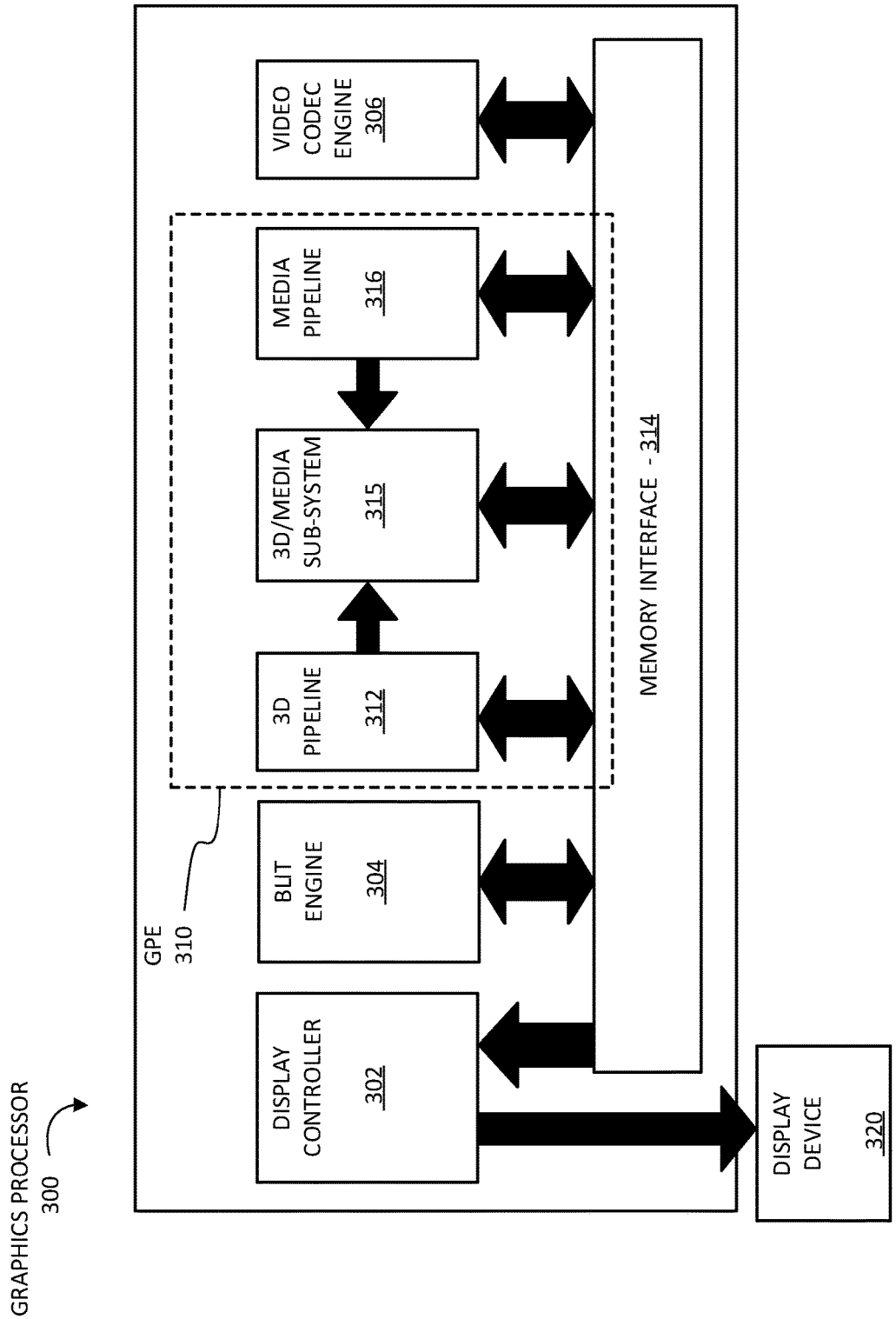

FIG. 13 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 14:
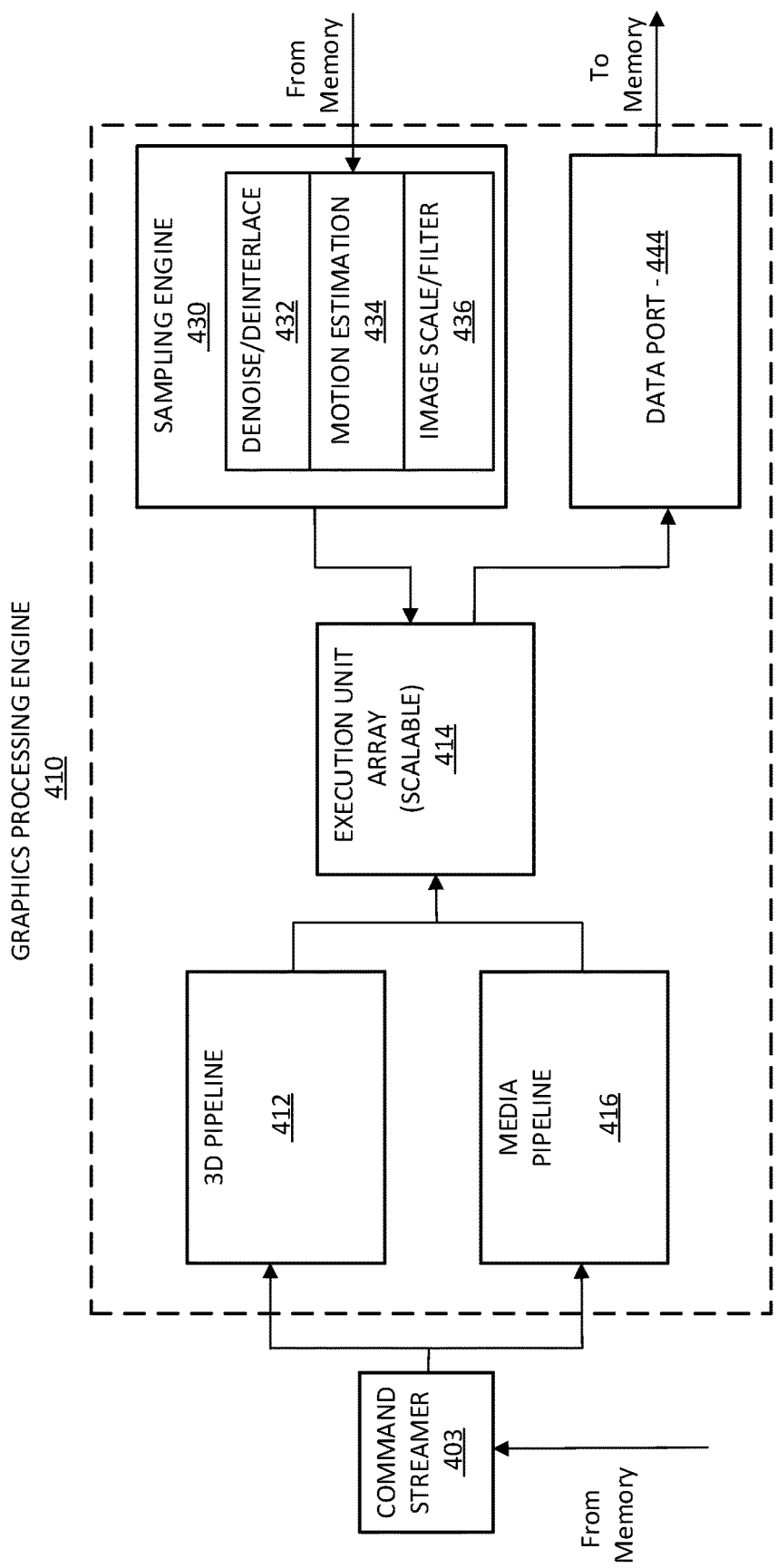
FIG. 14 is a block diagram of an example of a graphics processing engine according to an embodiment.

FIG. 14 is a block diagram of a graphics processing engine 410 of a graphics processor in accordance with some embodiments. In one embodiment, the GPE 410 is a version of the GPE 310 shown in FIG. 13. Elements of FIG. 14 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 15:
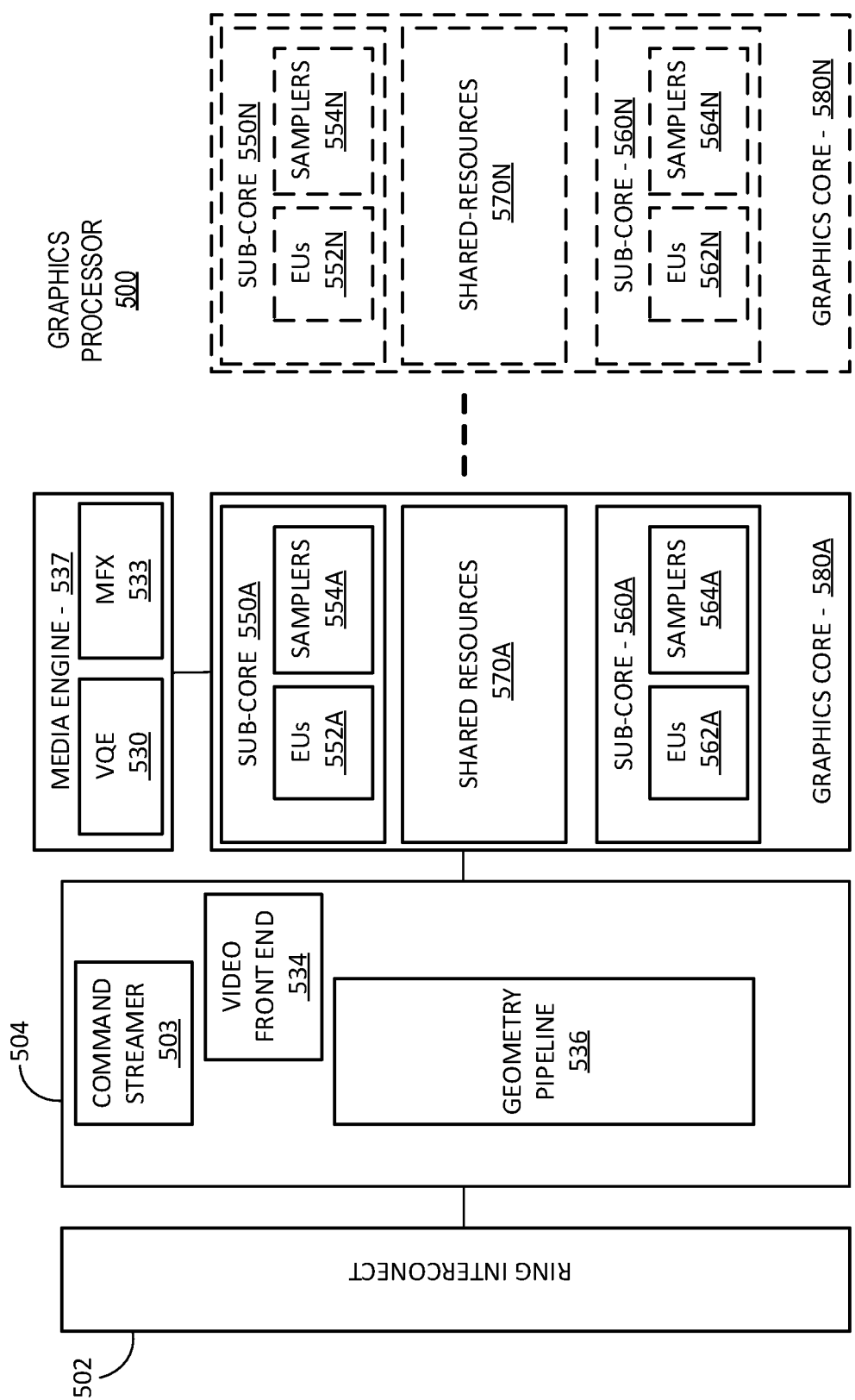
FIGS. 15-17 are block diagrams of examples of execution units according to an embodiment.

FIG. 15 is a block diagram of another embodiment of a graphics processor 500. Elements of FIG. 15 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 16:
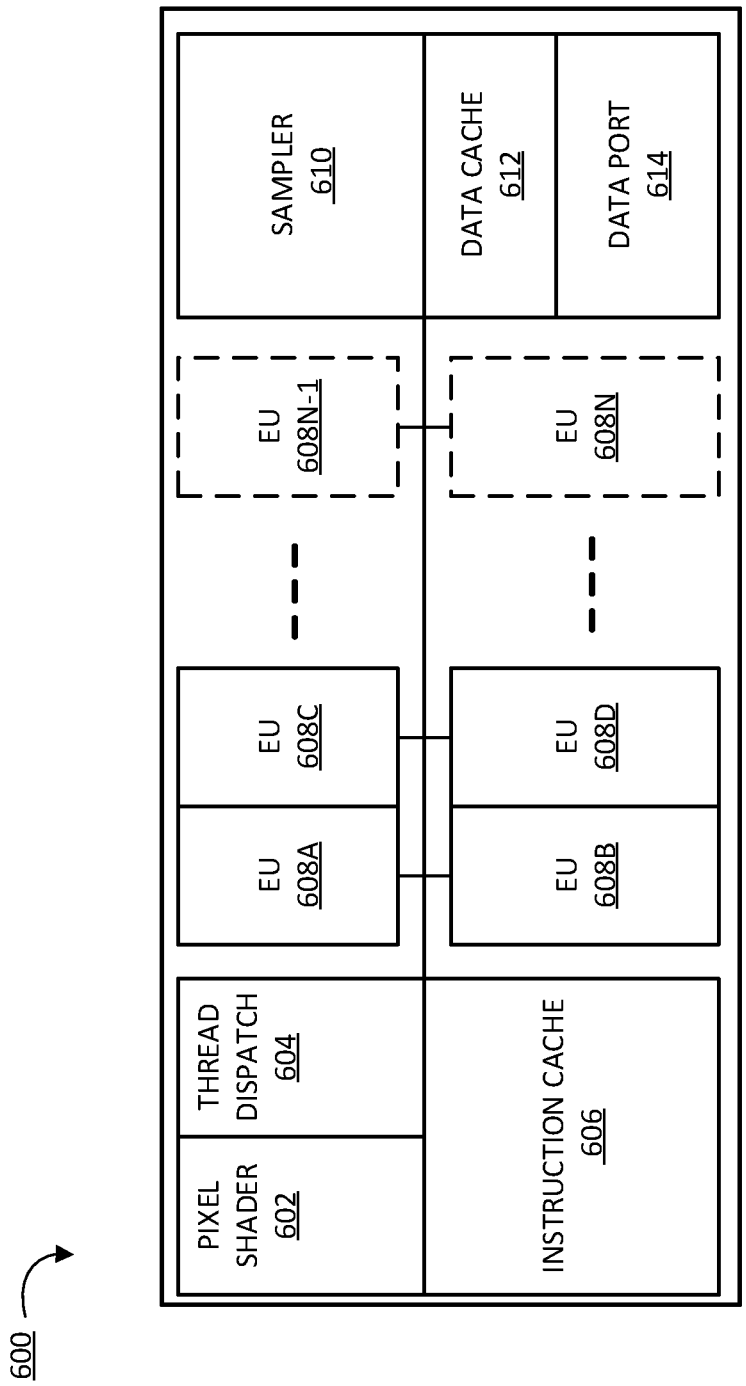

FIG. 16 illustrates thread execution logic 600 including an array of processing elements employed in some embodiments of a GPE. Elements of FIG. 16 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 15) dispatches vertex processing, tessellation, or geometry processing threads to thread execution logic 600 (FIG. 16). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 17:
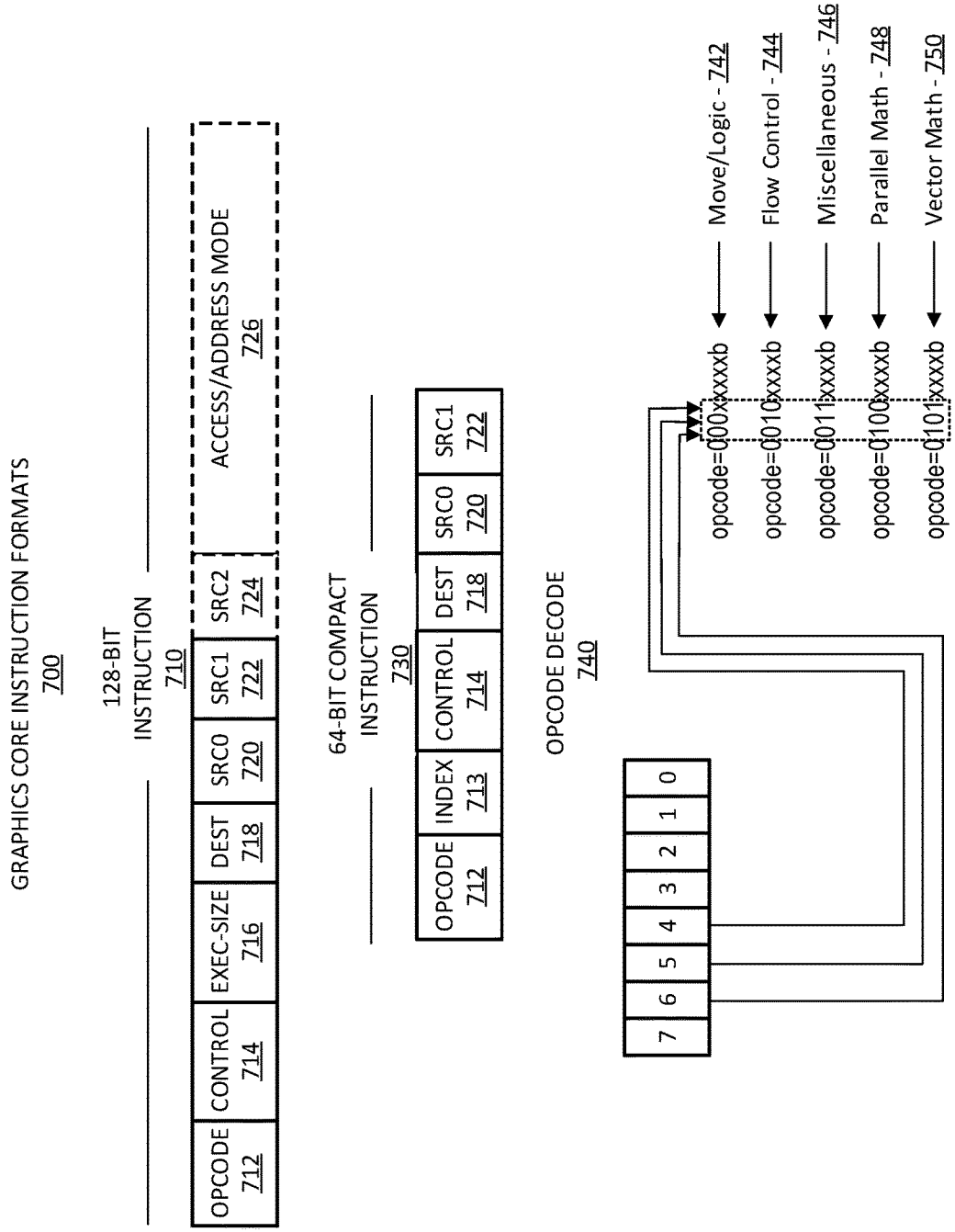

FIG. 17 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 18:
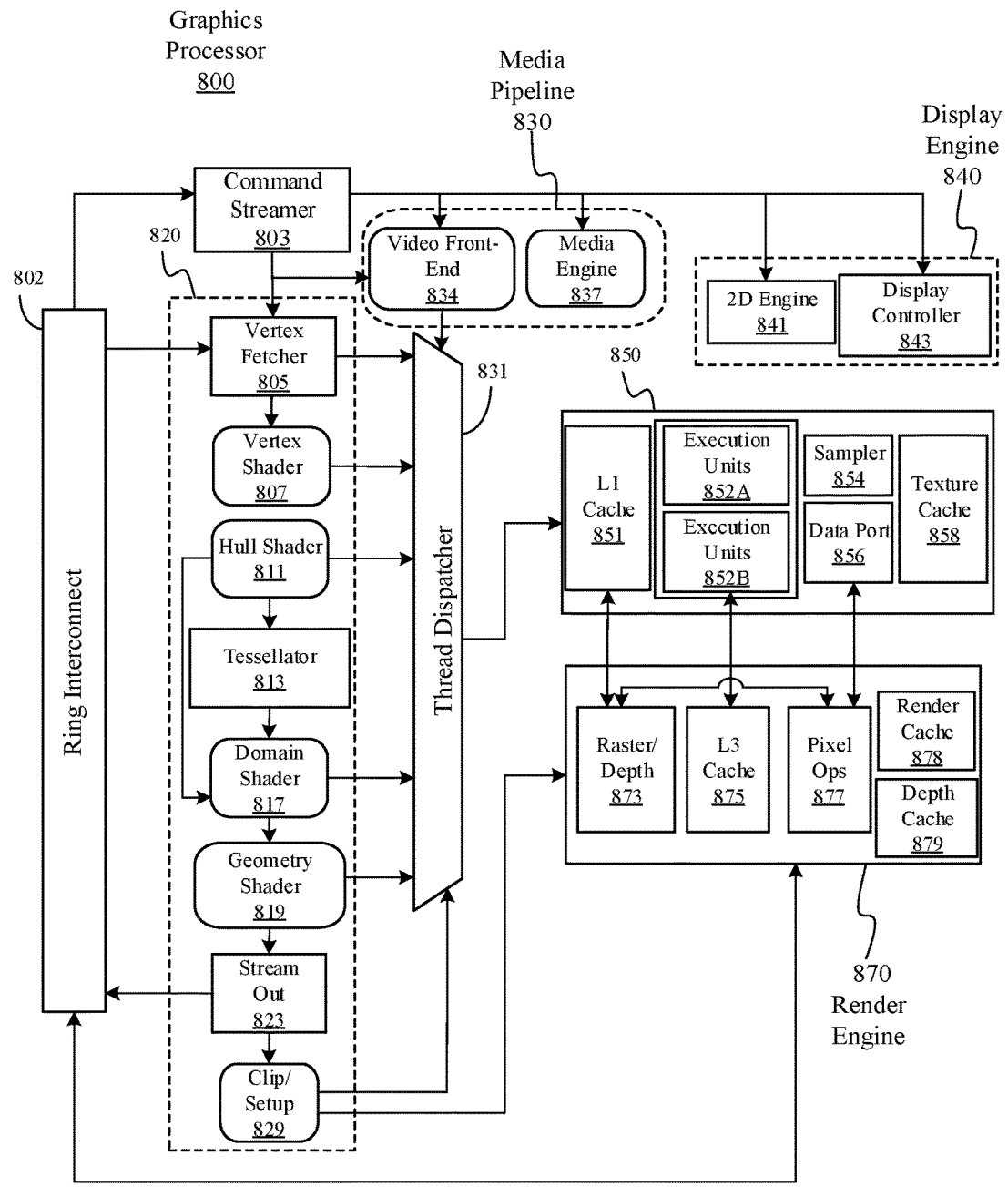
FIG. 18 is a block diagram of an example of a graphics pipeline according to an embodiment.

FIG. 18 is a block diagram of another embodiment of a graphics processor 800. Elements of FIG. 18 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides backend evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 19A:
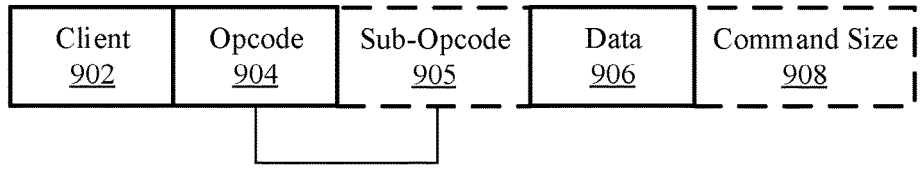
FIGS. 19A-19B are block diagrams of examples of graphics pipeline programming according to an embodiment.
Figure 19B:
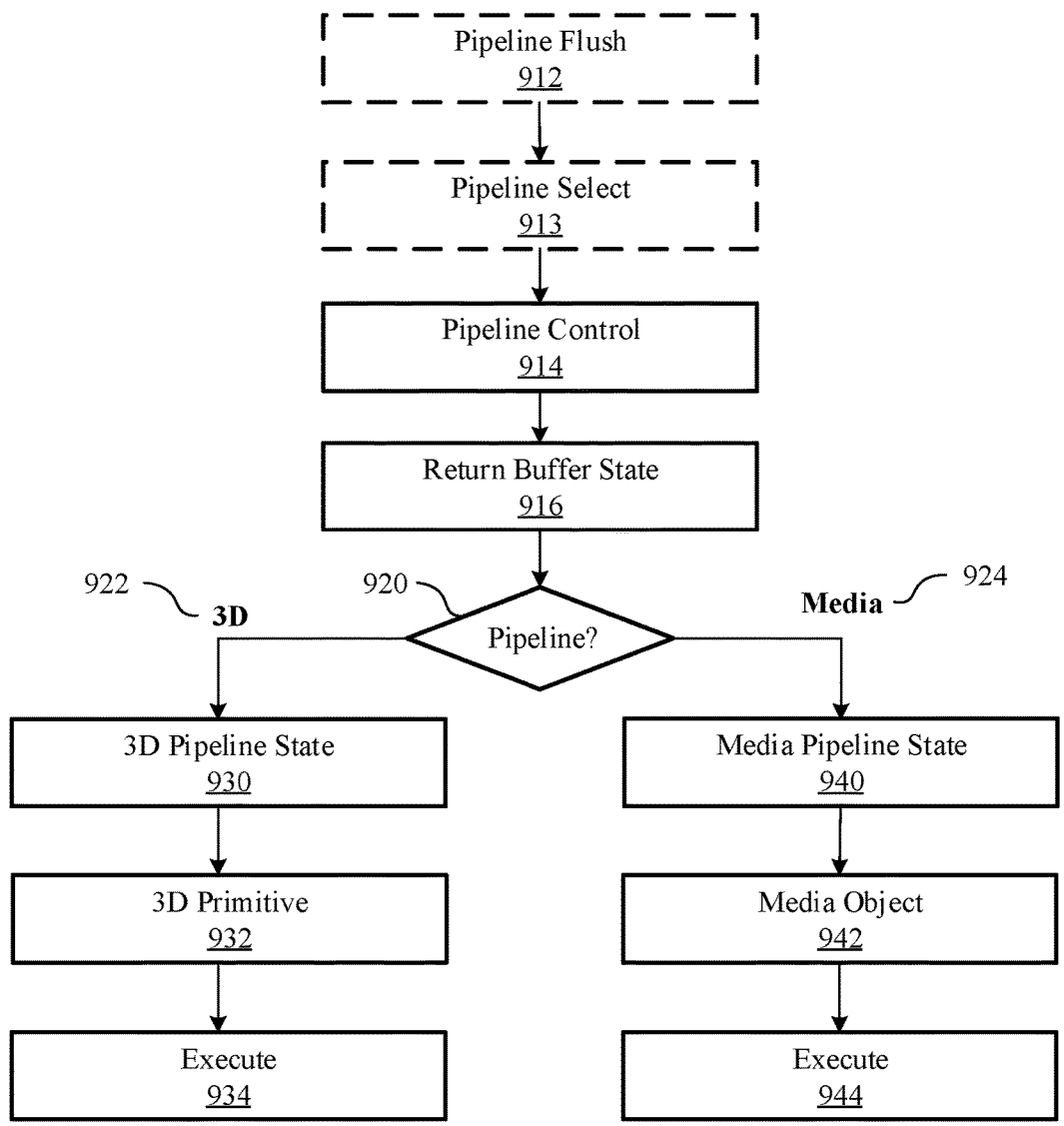

FIG. 19A is a block diagram illustrating a graphics processor command format 900 according to some embodiments. FIG. 19B is a block diagram illustrating a graphics processor command sequence 910 according to an embodiment. The solid lined boxes in FIG. 19A illustrate the components that are generally included in a graphics command while the dashed lines include components that are optional or that are only included in a sub-set of the graphics commands. The exemplary graphics processor command format 900 of FIG. 19A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 19B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 20:
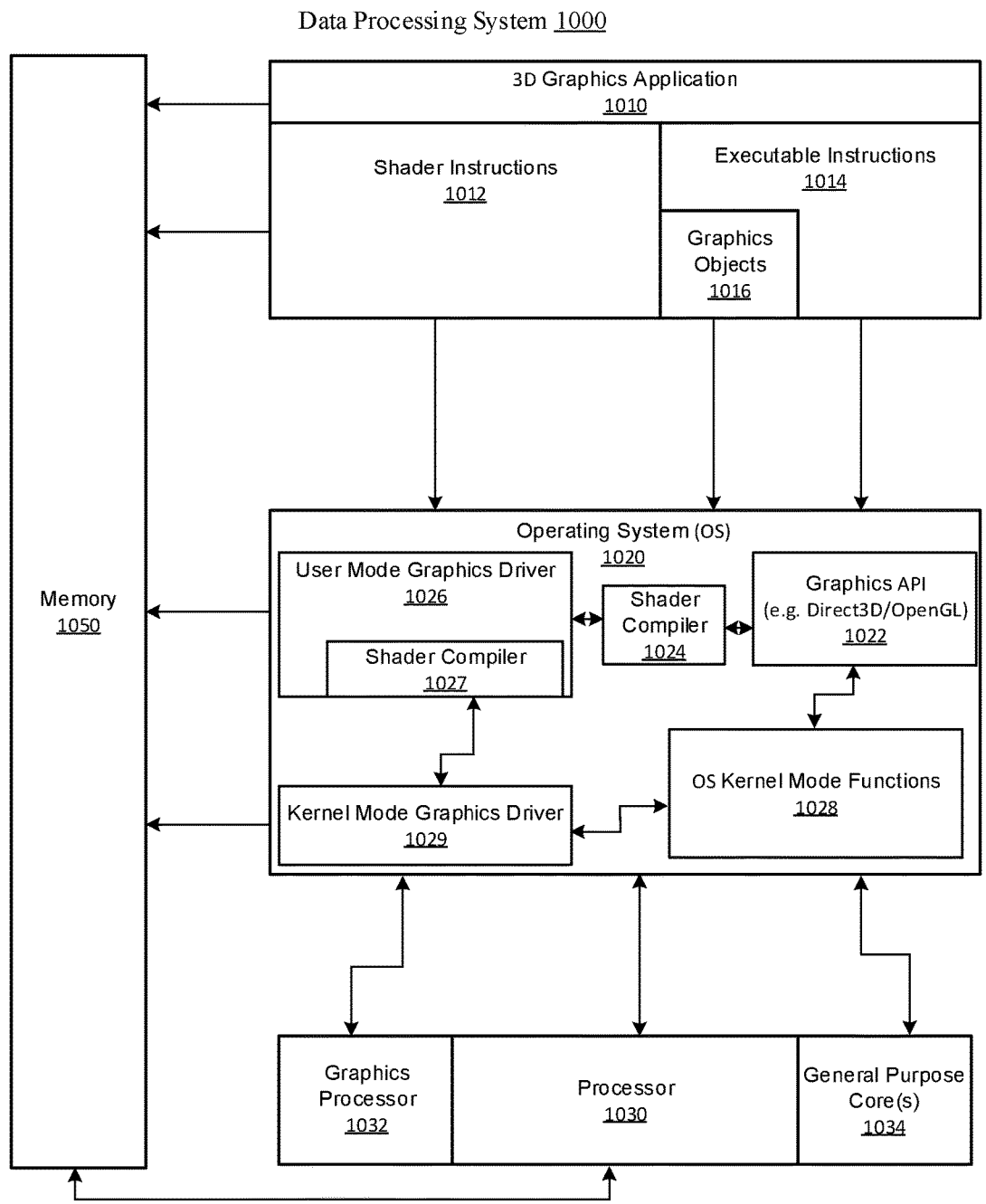
FIG. 20 is a block diagram of an example of a graphics software architecture according to an embodiment.

FIG. 20 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 21:
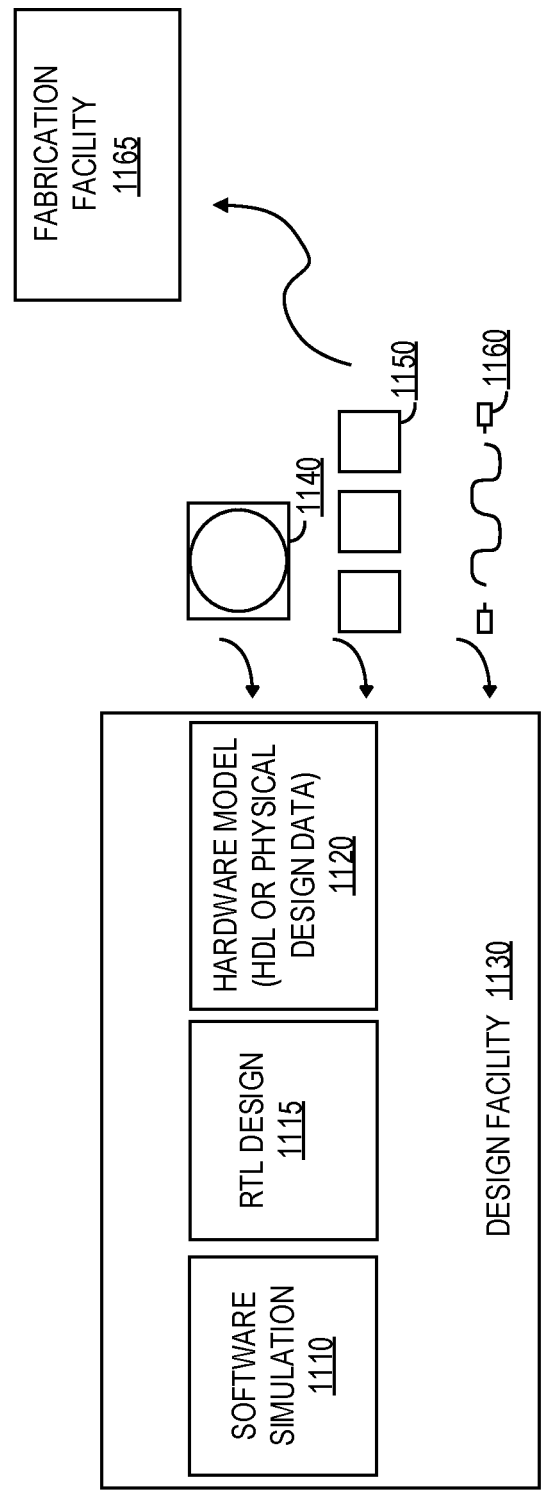
FIG. 21 is a block diagram of an example of an intellectual property (IP) core development system according to an embodiment.

FIG. 21 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 22:
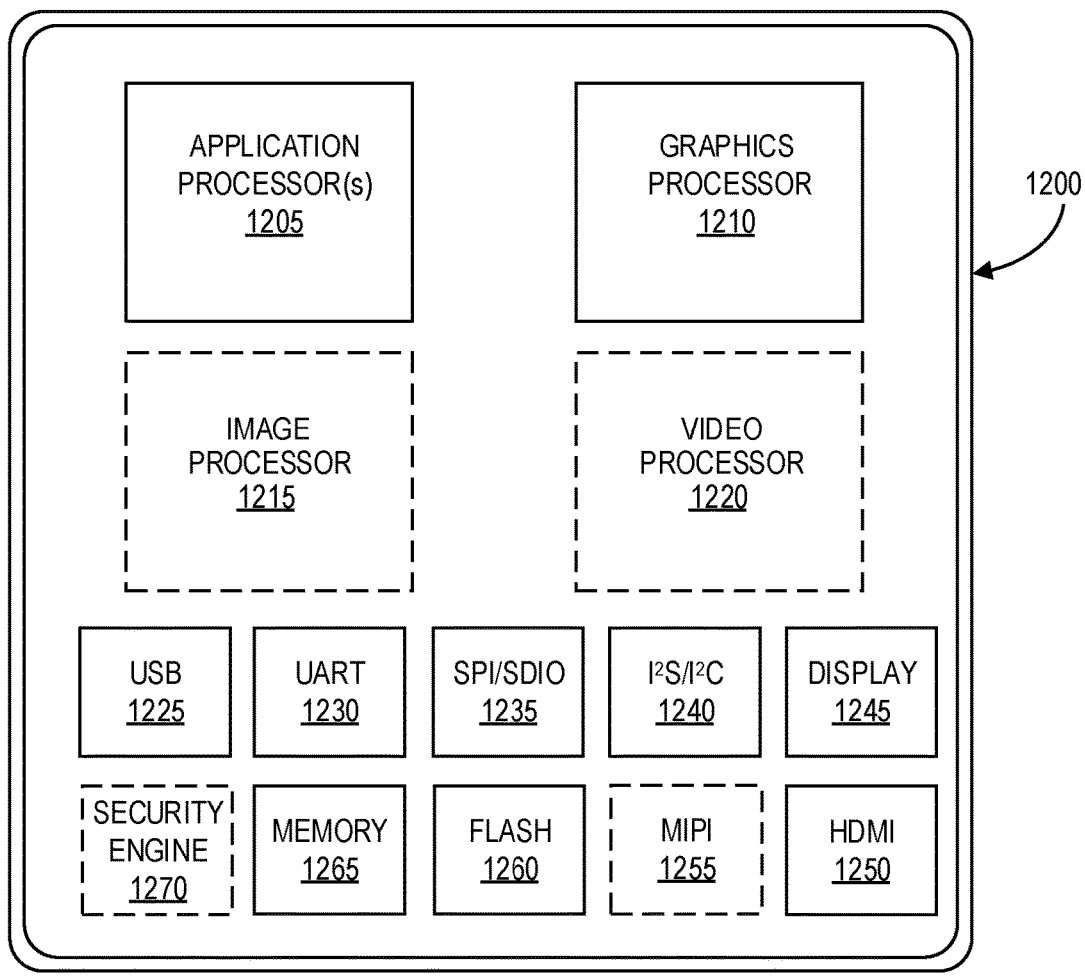
FIG. 22 is a block diagram of an example of a system on a chip integrated circuit according to an embodiment.

FIG. 22 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, universal asynchronous receiver/transmitter (UART) controller 1230, a serial peripheral interface (SPI)/secure digital input output (SDIO) controller 1235, and an integrated interchip sound (I2S)/inter-integrated circuit (I2C) controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Advantageously, in some embodiments any of the system 100, the processor 200, graphics processor 300, graphics processing engine 410, graphics processor 500, thread execution logic 600, graphics processor 800, data processing system 1000, and/or the integrated circuit 1200 may be integrated or configured with any of the various embodiments described herein (e.g. or portions thereof), including, for example, those described in the following Additional Notes and Examples.

ADDITIONAL NOTES AND EXAMPLES

Example 1 may include an electronic processing system, comprising graphics memory, and a graphics processor communicatively coupled to the graphics memory, the graphics processor including a renderer to render a frame, a frame divider communicatively coupled to the renderer to divide the frame into two or more sub-frames, a parallelized post-processor communicatively coupled to the frame divider to post-process a rendered sub-frame in parallel with the renderer, a parallelized encoder communicatively coupled to the post-processor to encode a post-processed sub-frame in parallel with the parallelized post-processor, a parallelized packetizer communicatively coupled to the parallelized encoder to create a packetized sub-frame for an encoded sub-frame in parallel with the parallelized encoder, and a parallelized transmitter communicatively coupled to the parallelized packetizer to transmit a packetized sub-frame in parallel with the parallelized packetizer.

Example 2 may include the system of Example 1, further comprising a display device communicatively coupled to the parallelized transmitter, the display device including a parallelized receiver to receive the packetized sub-frame.

Example 3 may include the system of Example 2, wherein the display device further comprises a display processor communicatively coupled to the parallelized receiver to perform one or more post-process operations, and wherein the graphics processor further comprises an offloader communicatively coupled to the frame divider to offload one or more post-process operations to the display processor.

Example 4 may include a graphics apparatus comprising a frame divider to divide a frame into two or more sub-frames, and a parallelized post-render stage communicatively coupled to the frame divider to process a sub-frame of the two or more sub-frames in parallel with a render operation.

Example 5 may include the apparatus of Example 4, wherein the parallelized post-render stage includes a parallelized post-processor communicatively coupled to the frame divider to post-process a rendered sub-frame in parallel with the render operation.

Example 6 may include the apparatus of Example 5, wherein the parallelized post-render stage includes a parallelized encoder communicatively coupled to the post-processor to encode a post-processed sub-frame in parallel with the parallelized post-processor.

Example 7 may include the apparatus of Example 6, wherein the parallelized post-render stage includes a parallelized packetizer communicatively coupled to the parallelized encoder to packetize an encoded sub-frame in parallel with the parallelized encoder.

Example 8 may include the apparatus of Example 7, wherein the parallelized post-render stage includes a parallelized transmitter communicatively coupled to the parallelized packetizer to transmit a packetized sub-frame in parallel with the parallelized packetizer.

Example 9 may include the apparatus of any of Examples 4 to 8, wherein the frame divider is further to dynamically re-divide the frame into a different set of two or more sub-frames.

Example 10 may include the apparatus of any of Examples 4 to 8, wherein the parallelized post-render stage includes an offloader communicatively coupled to the frame divider to offload one or more post-process operations.

Example 11 may include a method of processing graphics, comprising dividing a frame into two or more sub-frames, and processing a sub-frame of the two or more sub-frames in parallel with a render operation.

Example 12 may include the method of Example 11, further comprising post-processing a rendered sub-frame in parallel with the render operation.

Example 13 may include the method of Example 12, further comprising encoding a post-processed sub-frame in parallel with the post-processing.

Example 14 may include the method of Example 13, further comprising packetizing an encoded sub-frame in parallel with the encoding.

Example 15 may include the method of Example 14, further comprising transmitting a packetized sub-frame in parallel with the packetizing.

Example 16 may include the method of any of Examples 11 to 15, further comprising dynamically re-dividing the frame into a different set of two or more sub-frames.

Example 17 may include the method of any of Examples 11 to 15, further comprising offloading one or more post-process operations.

Example 18 may include at least one computer readable medium, comprising a set of instructions, which when executed by a computing device, cause the computing device to divide a frame into two or more sub-frames, and process a sub-frame of the two or more sub-frames in parallel with a render operation.

Example 19 may include the at least one computer readable medium of Example 18, comprising a further set of instructions, which when executed by a computing device, cause the computing device to post-process a rendered sub-frame in parallel with the render operation.

Example 20 may include the at least one computer readable medium of Example 19, comprising a further set of instructions, which when executed by a computing device, cause the computing device to encode a post-processed sub-frame in parallel with the post-processing.

Example 21 may include the at least one computer readable medium of Example 20, comprising a further set of instructions, which when executed by a computing device, cause the computing device to packetize an encoded sub-frame in parallel with the encoding.

Example 22 may include the at least one computer readable medium of Example 21, comprising a further set of instructions, which when executed by a computing device, cause the computing device to transmit a packetized sub-frame in parallel with the packetizing.

Example 23 may include the at least one computer readable medium of any of Examples 18 to 22, comprising a further set of instructions, which when executed by a computing device, cause the computing device to dynamically re-divide the frame into a different set of two or more sub-frames.

Example 24 may include the at least one computer readable medium of any of Examples 18 to 22, comprising a further set of instructions, which when executed by a computing device, cause the computing device to offload one or more post-process operations.

Example 25 may include a graphics apparatus, comprising means for dividing a frame into two or more sub-frames, and means for processing a sub-frame of the two or more sub-frames in parallel with a render operation.

Example 26 may include the apparatus of Example 25, further comprising means for post-processing a rendered sub-frame in parallel with the render operation.

Example 27 may include the apparatus of Example 26, further comprising means for encoding a post-processed sub-frame in parallel with the post-processing.

Example 28 may include the apparatus of Example 27, further comprising means for packetizing an encoded sub-frame in parallel with the encoding.

Example 29 may include the apparatus of Example 28, further comprising means for transmitting a packetized sub-frame in parallel with the packetizing.

Example 30 may include the apparatus of any of Examples 25 to 29, further comprising means for dynamically re-dividing the frame into a different set of two or more sub-frames.

Example 31 may include the apparatus of any of Examples 25 to 29, further comprising means for offloading one or more post-process operations.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   graphics memory; and
   a graphics processor having a graphics processor pipeline, the graphics processor communicatively coupled to the graphics memory, the graphics processor including:
   a renderer to render a frame;
   a frame divider communicatively coupled to the renderer to divide the frame into two or more sub-frames;
   a parallelized post-processor communicatively coupled to the frame divider to post-process a rendered sub-frame in parallel with the renderer;
   a parallelized encoder communicatively coupled to the post-processor to encode a post-processed sub-frame in parallel with the parallelized post-processor;
   a parallelized packetizer communicatively coupled to the parallelized encoder to create a packetized sub-frame for an encoded sub-frame in parallel with the parallelized encoder; and
   a parallelized transmitter communicatively coupled to the parallelized packetizer to transmit a packetized sub-frame in parallel with the parallelized packetizer,
   wherein the graphics processor pipeline is to concurrently process different parts of a same frame.

2. The system of claim 1, further comprising:
   a display device communicatively coupled to the parallelized transmitter, the display device including a parallelized receiver to receive the packetized sub-frame.

3. The system of claim 2, wherein the display device further comprises a display processor communicatively coupled to the parallelized receiver to perform one or more post-process operations, and wherein the graphics processor further comprises an offloader communicatively coupled to the frame divider to offload one or more post-process operations to the display processor.

4. A graphics apparatus having a graphics processor pipeline, the graphics apparatus comprising:
   a frame divider to divide a frame into two or more sub-frames; and
   a parallelized post-render stage communicatively coupled to the frame divider to process a sub-frame of the two or more sub-frames in parallel with a render operation,
   wherein the graphics processor pipeline is to concurrently process different parts of a same frame, and
   wherein the parallelized post-render stage includes:
   a parallelized post-processor communicatively coupled to the frame divider to post-process a rendered sub-frame in parallel with the render operation,
   a parallelized encoder communicatively coupled to the post-processor to encode a post-processed sub-frame in parallel with the parallelized post-processor, a parallelized packetizer communicatively coupled to the parallelized encoder to packetize an encoded sub-frame in parallel with the parallelized encoder, and a parallelized transmitter communicatively coupled to the parallelized packetizer to transmit a packetized sub-frame in parallel with the parallelized packetizer.

5. A method of processing graphics, comprising:

dividing, via a graphics processor having a graphics processor pipeline, a frame into two or more sub-frames;

processing a sub-frame of the two or more sub-frames in parallel with a render operation post-processing a rendered sub-frame in parallel with the render operation;

encoding a post-processed sub-frame in parallel with the post-processing;

packetizing an encoded sub-frame in parallel with the encoding; and transmitting a packetized sub-frame in parallel with the packetizing, wherein the graphics processor pipeline concurrently processes different parts of a same frame.

6. At least one non-transitory computer readable medium, comprising a set of instructions, which when executed by a computing device having a graphics processor pipeline, cause the computing device to:

divide a frame into two or more sub-frames;

process a sub-frame of the two or more sub-frames in parallel with a render operation;

post-process a rendered sub-frame in parallel with the render operation;

encode a post-processed sub-frame in parallel with the post-processing;

packetize an encoded sub-frame in parallel with the encoding; and transmit a packetized sub-frame in parallel with the packetizing, wherein the graphics processor pipeline is to concurrently process different parts of a same frame.

* * * * *